(12) United States Patent
Davidson et al.

(10) Patent No.: US 12,287,393 B1
(45) Date of Patent: Apr. 29, 2025

(54) OBJECT TRACKING

(71) Applicant: Utah State University Space Dynamics Laboratory, North Logan, UT (US)

(72) Inventors: Morgan Davidson, River Heights, UT (US); Jacob Christensen, North Logan, UT (US)

(73) Assignee: Utah State University Space Dynamics Laboratory, North Logan, UT (US)

( * ) Notice: Subject to any disclaimer, the term of this patent is extended or adjusted under 35 U.S.C. 154(b) by 995 days.

(21) Appl. No.: 17/343,496

(22) Filed: Jun. 9, 2021

(51) Int. Cl.
*G01S 13/72* (2006.01)

(52) U.S. Cl.
CPC ..................... *G01S 13/72* (2013.01)

(58) Field of Classification Search
CPC . G01S 13/72; G01S 7/95; G01S 13/75; G01S 13/91
USPC ................................ 342/95, 70, 457, 357.25
See application file for complete search history.

(56) References Cited

U.S. PATENT DOCUMENTS

| | | | |
|---|---|---|---|
| 2009/0234198 A1* | 9/2009 | Vorse | A61B 5/0002 600/301 |
| 2013/0054138 A1* | 2/2013 | Clark | G01C 21/203 701/482 |
| 2016/0166935 A1* | 6/2016 | Condrey | A63F 13/48 463/31 |

OTHER PUBLICATIONS

Yaakov Bar-Shalom et al., Tracking and Data Fusion: A Handbook of Algorithms, 2011, pp. 158-161, 438-441, and 458-459, Yaakov Bar-Shalom.

* cited by examiner

Primary Examiner — Bo Fan

(57) ABSTRACT

In various example embodiments, a system and method for tracking objects in a three-dimensional space is disclosed. One method includes receiving detections representing targets, increasing a classification of a track in response to a detection matching the track, decreasing a classification of a track in response to no detections matching the track, and processing detections according to a classification level of the track.

20 Claims, 14 Drawing Sheets

OBJECT TRACKING

TECHNICAL FIELD

Embodiments of the present disclosure relate generally to object tracking and, more particularly, but not by way of limitation, to managing a plurality of tracks for objects in a three-dimensional space.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments an object tracking system is configured to track multiple objects in an observable three-dimensional space. In certain examples, a number of objects in the three-dimensional space exceeds a processing capability of a tracking system. Systems and methods disclosed herein overcome processing limitations by classifying tracks and performing varying degrees of processing according to a classification of a track.

For example, an object tracking system may limit processing of detections that do not conform to any known tracks while more carefully processing detections that are consistent with a confirmed track. In this way, limited processing resources are dedicated to confirmed tracks which increases the accuracy of known objects in the three-dimensional space.

Figure 1:
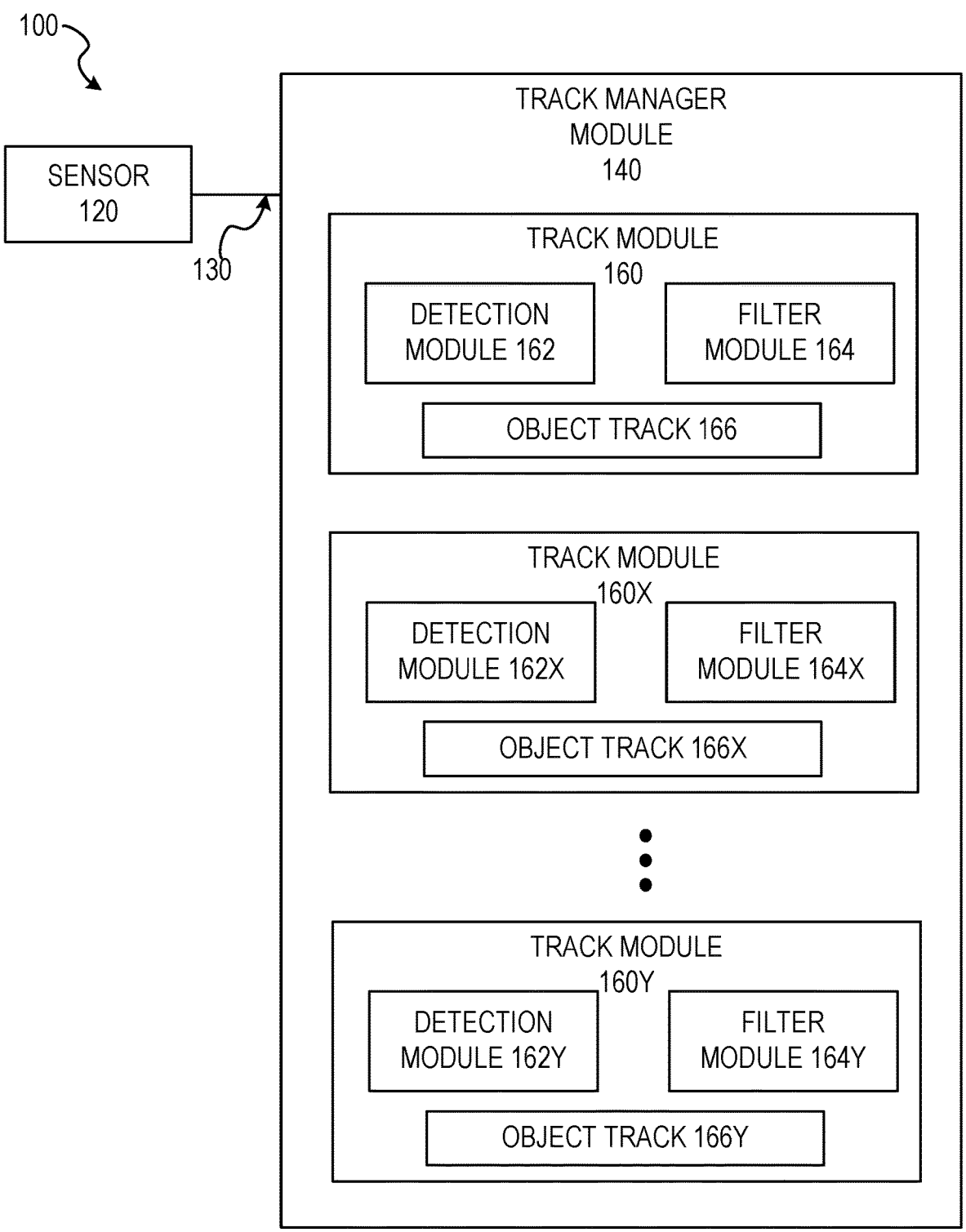
FIG. 1 is a block diagram illustrating an object tracking system, according to some example embodiments.

FIG. 1 is a block diagram illustrating an object tracking system, according to some example embodiments. In one example embodiment, the sensor 120 transmits one or more detections 130 to the track manager module 140. The sensor 120 may transmit the detections 130 via a wired or a wireless connection. The sensor 120 may transmit detections 130 to the track manager module 140 in any other way and this disclosure is meant to include all such ways.

In another example embodiment, the sensor 120 may transmit measurements, e.g., raw data from a sensor 120, to the track manager module 140 and the track manager module 140 determines detections 130 using the measurements.

In one example embodiment, the sensor 120 includes a radar system. Radar is a detection system that uses radio waves to determine aspects of objects to a certain degree of accuracy. In certain examples, the sensor 120 is a radar system that determines range, angle, velocity, etc. In other example embodiments, a radar system includes a transmitter that produces electromagnetic waves in a specific (e.g., predefined) frequency range, a transmitting antenna, a receiving antenna and a computing systems to process acquired data (e.g., detections).

In some example embodiments, the receiving antenna and the transmitting antenna are the same physical antenna, however, this is not necessarily the case and this disclosure is not limited in this regard.

Of course, many different types of radar systems may be used and this disclosure is not limited in this regard. For example, the sensor 120 may be a monostatic radar system, a bistatic radar system, a pseudo-monostatic radar system, a multi-static radar system, a passive radar system, or any other type of radar system known by one skilled in the art.

In certain embodiments, a bistatic radar system produces a plurality of measurements. A measurement may be a detection, but this is not necessarily the case. In another example embodiment, a measurement is a detection. In another example embodiment, a detection is a measurement that exceeds a threshold magnitude. Thus, in this example embodiment, a set of measurements for a given period of time may result in a set of detections that is a subset of the set of measurements. For example, for a given set of measurements, each of the measurements that exceed a predetermined threshold magnitude is interpreted as a detection.

In one example embodiment, the sensor 120 is a bistatic radar system that produces a matrix of bistatic range doppler measurements for each time step in a set of time steps. Furthermore, the bistatic radar system may generate associated covariance matrices for each of the doppler measurements. In another example embodiment, the bistatic radar system generates associated covariance matrices for detections that result from measurements.

In another example embodiment, the sensor 120 includes an imaging sensor. In one example embodiment, an imaging sensor is configured to convert variable attenuation of light waves into electronic signals. In certain embodiments, an imaging sensor includes a directional vector that represents a direction where the imaging sensor is pointing. Using a directional vector in conjunction with a field of view for the imaging sensor can help determine respective directional vector for detections in the resulting data.

In one example embodiment, a machine learning system is configured to determine detections in a received image and use the vector information of the imaging sensor to determine an approximate vector towards the detection. For example, a machine learning system, such as a neural network, may be configured to detect airplanes in received imagery. Thus, the imaging sensor may be configured to generate detections for airplanes that are present in received imagery.

A neural network may be configured to detect all sorts of different objects in a two-dimensional image and this disclosure is meant to include all such networks. In certain example embodiments, the machine learning system is configured to detect airplanes, automobiles, birds, helicopters, insects, drones, missiles, gliding vehicles, or any other type of flying machine or object. Thus, in certain example embodiments, the sensor 120 is configured to generate detections and resulting approximate direction vectors for a whole host of different types of objects that may be visible in a received image.

In other example embodiments, the sensor 120 is configured to process a field of view for a camera and a pixel resolution. An approximate directional vector may be determined by dividing the field of view by the pixel resolution to generate an approximate directional vector for any given pixel in a received image.

In another example embodiment, the sensor 120 includes multiple sensors. For example, the sensor 120 may include a bistatic radar system in cooperation with an imaging camera. As will be further described, approximate detections from both the radar system and the imaging sensor can be combined to generate more accurate detections. Any other combination of sensors may be used and this disclosure is not limited in this regard. Thus, in this example embodiment, the sensor 120 generates coordinated detections from two or more sensors.

In one example embodiment, the sensor 120 includes a multi-int sensor fusion to fuse a beamforming radar and an electro-optical (EO) imager. For example, the beam forming radar may have a slower update rate than the EO imager and higher angular range for a detection, while the EO imager may have a faster update rate than the beamforming radar but provide a more accurate angular measurement. Combining a beamforming radar and an EO imager provides orthogonal measurements of detections and may increase detection accuracy.

In one example embodiment, the sensor 120 is configured to process sensor data and generate one or more detections. In another example embodiment, the sensor 120 is configured to transmit sensor data to the track manager module 140 and the track manager module 140 is configured to process the sensor data to generate detections.

In certain embodiment, sensor data is a direct output of the sensor. In one example embodiment, the sensor is an EO/IR sensor and the sensor data is an image. Many different types of sensors and sensor data may be used and this disclosure is meant to include all such sensors and sensor data.

In one example embodiment, a track manager module 140 is configured to receive detections from the sensor 120. In another example embodiment, the track manager module 140 receives detections of objects in a three-dimensional space. As previously described, the track manager module 140 may also concurrently receive detections from two or more sensors. In another example embodiment, the track manager module 140 generates the detections and provides them for consumption by the track modules 160.

In another example embodiment, the track manager module 140 stores detections and responds to requests from one or more track modules 160, 160X, 160Y. For example, in one embodiment, the track modules 160, 160X, 160Y, are configured to request detections from the track manager module 140.

In one example embodiment, respective track modules are configured to calculate an expected next detection and query the track manager module 140 for detections that are consistent with the expected next detection. In response, the track manager module 140 sends the matching detection to the track module that requested it.

As many track modules (e.g., 160, 160X, 160Y) request detections from the track manager module 140. Detections that are sent to one of the track modules are removed from a set of detections received from the sensor 120. In another example embodiment, in response to all the track modules (e.g., 160, 160X, 160Y) requesting next expected detections and the track manager module 140 sending the requested next expected detections to the respective track modules, there may or may not be remaining detections that were not requested by a track module.

In another example embodiment, in response to there being remaining unrequested detections, the track manager module 140 provisions an additional track module for each of the remaining detections. In this way, after each set of detections, there may be a track module associated with each detection.

In one example embodiment, in response to no detections matching an expected next detection from a track module, the track manager module 140 removes the track module. In this example embodiment, the track manager module 140 determines that the track module terminates because there are no detections that match the associated track.

In another example embodiment, the track manager module 140 removes a track module in response to a threshold number of iterations where there are no detections that match the associated track.

For example, and consistent with one embodiment, in response to a track module not finding any detections that match an expected next detection for four sets of detections received from the sensor 120, the track manager module 140 deletes the track module. In this example embodiment, the track module includes a terminated track as previously described. Other numbers of iterations may be used and this disclosure is not limited in this regard.

In one example embodiment, the track manager module 140 receives four detections from the sensor 120. The first track module 160 requests a detection that matches the first detection received from the sensor, the second track module 160X requests a detection that matches the second detection received from the sensor, and the third track module 160Y requests a detection that match the third detection received from the sensor. Thus, the fourth detection received form the sensor was not requested by any track modules.

In another example embodiment, the track manager module 140 includes dozens of track modules 160. The track manager module 140 may include any number of track modules and this disclosure is not limited in this regard.

In this example embodiment, the track manager module 140 provisions an additional track module and provides the fourth (unrequested) detection as the first point in the associated track from for the newly provisional track module.

In one example embodiment, a detection matching a requested detection includes the detection being within a threshold distance from the requested detection. In another embodiment, a detection matching a requested detection includes the detection being angularly consistent with the requested detection. For example, the requested detection may match a direction for the requested detection, but a distance may not be known to a sufficient degree of accuracy.

In another example embodiment, the track manager module 140 may employ a machine learning system to match detections with track modules. In one example, the track manager module 140 assigns detections to track modules to minimize error, or another metric, or the like.

In one example embodiment, two or more track modules request a same detection and the track manager module 140 determines which of the track modules 160 receives the detection. In one example embodiment, the track manager module 140 selects one of the track modules 160 that requested the detection according to a distance between the location of the detection and a location of an expected next detection generated by the respective track modules 160.

In one example embodiment, the track manager module 140 is configured to assign a classification level to a track module. In one example, embodiment, there are three classification levels: "preliminary," "tentative," and "confirmed." In this example embodiment, a newly provisioned track module is assigned to a preliminary classification level. In response to an additional detection being received form the sensor 120 that matches the associated track, the track manager module 140 increases the classification level to "tentative." Again, in response to another additional detection being received from the sensor 120 that matches the associated track, the track manager module 140 again increases the classification level of the track module to "confirmed."

Furthermore, consistent with this example embodiment, the track manager module may decrease a classification level for a track module in response to no detections matching the track for the track module. For example, in response to a track module being at a "confirmed" classification level and no detections matching the associated track, the track manager module 140 decreases the classification level of the track module to "tentative." Again, in response to receiving another set of detections and no detections matching the track module again, the track manager module 140 decreases the classification level of the track module to "preliminary." Then, in response to receiving another set of detections from the sensor 120 and no detections match the track for the track module, the track manager module 140 deletes the track module. In this way, because there are three classification levels, the track manager module 140 deletes the track module in response to there being no detections that match the track for a track module in three or more consecutive sets of detections. Of course, this is not necessarily the case as the track manager module 140 may delete the track module in response to any number of consecutive iterations of detections or a proportion of recent iterations of detections with none matching the track for the track modules.

In another example embodiment, the classification levels are numerical values. For example, the classification levels may be from 1 to 10. Of course, this is not necessarily the case and any number of classification levels may be used. In another example embodiment, the classification levels are selected from a set of predefined classification levels. For example, the classification levels may be read from a hardware memory or received from a remote computing system. There are many different ways to manage a set of classification levels and this disclosure is meant to include all such ways.

In one example embodiment, a track module 160 includes a detection module 162 and a filter module 164. Furthermore, track module 160X includes detection module 162X and filter module 164X, and track module 160Y includes detection module 162Y and filter module 164Y. In other example embodiments, the 'N' does not necessarily designate the $14^{th}$ track module as the track manager module 140 may include any number of track modules 160.

In one example embodiment, the track module 160 applies a first level of processing for tracks at a first classification level and a second level of processing for tracks at a second classification level. In one example, the track module 160 applies a first type of noise equation for track modules 140 at a "confirmed" classification level and a second type of noise equation for track modules 140 at an "intermediate" classification level. In another example embodiment, the classification levels are numerical values as will be further described. In other example embodiments, the track module 160 applies the filter module in response to a classification level for the track module 160 being at a predetermined classification level and does not apply the filter module in response to a classification level for the track module 160 not matching the predetermined classification level.

In one example embodiment, the detection module 162 is configured to determine a next expected detection consistent with a current track for the detection module 162X. In this example embodiment, the detection module 162X queries the track manager module 140 for a closest matching detection to the expected next detection. In another example embodiment, the detection module 162X reviews all of the available detection available from the track manager module 140 and selects a closest matching detection.

In another example embodiment, the detection module 162X determines a pattern for previously matching detections and estimates a next detection according to the pattern. In one example embodiment, the pattern is a straight line and in response to three or more detections being in the straight line, the detection module 162X determines that the next expected detection is also in the line.

In one example embodiment, the pattern is a curve and the detection module 162X determines the next expected detection according to the pattern of the curve. In another example embodiment, the pattern includes a direction and a velocity.

In another example embodiment, the track manager module 140 assigns detections to currently provisioned track modules 162. As previously described, and to minimize error, the track manager module 140 may assign detections to a track module that are not within a threshold error of the expected next detection. In response, the detection module 162X increases the expected error so that subsequent expected next detections are with a larger range of error. In certain embodiments, the error is measured as a percentage difference between an expected next detection and an available detection from the sensor 120.

In one example embodiment, the filter module 164 is configured to provide track data to the detection module 162. In another example embodiment, the filter module 164 is configured to incorporate the detection that corresponds to the object track 166 with the object track 166 in response to receiving the associated detection. An object track, e.g., object track 166, has associated data, or object track data, tied to the object track.

In another example embodiment, the filter module 164 incorporates the detection by adding the detection to the object track 166. Thus, in a next iteration of detections, the incorporated detection is now part of the object track 166 data that may be provided by the filter module 164.

In one example embodiment, the filter module 164 is configured to apply a Kalman filter to a detection to more accurately determine a location of the detection (e.g., a location represented by the detection). In certain embodiments, the track manager module 140 applies the filter module 164 by applying a Kalman filter to received detections. In another example embodiment, the filter module 164 is configured to apply a Kalman filter to previously received detections that are part of a track to determine a next expected detection as described herein.

In another example embodiment, the filter module 164 applies the Kalman filter to generate a next expected detection in response to the track module 160 having a predefined classification. In one example embodiment, the track module 160 applies the Kalman filter in response to the track module having a classification of "4." In another example embodiment, the track module 160 applies the filter module 164 in response to the track module 160 having a classification of "confirmed."

A Kalman filter is a quadratic estimation. In one example embodiment, the Kalman filter uses a series of measurements observed over time and produces estimates of unknown variables. In this context, and consistent with certain embodiments, the filter module 164 applies a Kalman filter to generate a next expected detection using previous detections that are associated with a track for a specific track module.

In another example embodiment, the filter module 164 generates an expected next detection according to previous detections that are part of a track associated with the respective track module 140. In one example embodiment, the filter module 164 applies a Kalman filter to detections from two or more sensors as described herein.

In another example embodiment, the filter module 164 determines a next expected detection in two spaces, bistatic space, and Cartesian space. In this example embodiment, bistatic space is two-dimensional space defined by bistatic range and bistatic velocity measurements by the sensor 120. Furthermore, in this example embodiment, Cartesian space is three-dimensional Euclidean space. In another example embodiment, the track module 140 maintains tracks in Bistatic space and Cartesian space. In other example embodiments, the filter module 164 applies a linear Kalman filter to associate next expected detections generated by the detection module 162 and detections received from the sensor 120.

In one example embodiment, the filter module 164 applies a linear Kalman filter for bistatic space and applies an Extended Kalman Filter (EKF) for detections in Cartesian space in response to nonlinearities in sensor measurements in this space.

In one example embodiment, the sensor 120 generates multiple measurements of bistatic range, bistatic velocity, and Cartesian position. In another example embodiment, the Cartesian position is generated using angle-of-arrival information. In one example embodiment, the data association module 162 associates detections in bistatic space with single measurements in Cartesian space using Mahalanobis (statistical) distance. Thus, in certain embodiments, the filter module 164 processes detections in bistatic space (e.g., a bistatic tracker) and detections in Cartesian space (e.g., a Cartesian tracker).

In another example embodiment, the filter module 164 generates estimates of bistatic range and target velocity. In this example embodiment, detections represent objects being tracked by the object tracking system 100.

In one example embodiment, the instantaneous bistatic range (proportional difference of arrival) can be calculated from:

$$r(t) = \sqrt{(x-x_t)^2 + (y-y_t)^2 + (z-z_t)^2} + \sqrt{(x-x_r)^2 + (y-y_r)^2 + (z-z_r)^2} - r_b \qquad (1)$$

where $(x, y, z)$ is the target position, $(x_t, y_t, z_t)$ is the transmitter position, $(x_r, y_r, z_r)$ is the receiver position, and $r_b$ is the base line length (distance between transmitter and receiver).

In another example embodiment the instantaneous bistatic velocity (proportional to the Doppler shift) calculated as the first derivative of the bistatic range has the following form:

$$v(t) = \frac{(x-x_t)v_x + (y-y_t)v_y + (z-z_t)v_z}{\sqrt{(x-x_t)^2 + (y-y_t)^2 + (z-z_t)^2}} + \frac{(x-x_r)v_x + (y-y_r)v_y + (z-z_r)v_z}{\sqrt{(x-x_r)^2 + (y-y_r)^2 + (z-z_r)^2}} \qquad (2)$$

where $(v_x, v_y, v_z)$ is the vector of target velocities. In the sequel, the equations (1) and (2) will be used for the constructing the EKF.

States $$x_{bk} = \begin{bmatrix} r_b \\ v_b \\ a_b \end{bmatrix}_k = \begin{bmatrix} x_{b1} \\ x_{b2} \\ x_{b3} \end{bmatrix}_k \text{ where, } \begin{array}{l} r_b = \text{bistatic range} \\ v_b = \text{bistatic velocity} \\ a_b = \text{bistatic acceleration} \end{array}$$

Process equation $\quad x_{bk} = F_b x_{bk-1} + w_{bk}$ $$F_b = \begin{bmatrix} 1 & T & T^2/2 \\ 0 & 1 & T \\ 0 & 0 & 1 \end{bmatrix} \text{ where } T = \text{sample time}$$

Measurement equation $\quad z_k = H_b x_{bk} + v_k$ $$H_b = \begin{bmatrix} 1 & 0 & 0 \\ 0 & 1 & 0 \end{bmatrix}$$

In one example embodiment, a bistatic tracker process is determined by . . .

$x_{bk} = F_b x_{bk-1} + w_{bk} \quad z_k = H_b x_{bk} + v_k$ where $w_{bk}$ and $v_k$ are described by the covariance matrices $Q_b$ and $R$ respectively:

$$Q_b = \sigma_w^2 \begin{bmatrix} T^4/4 & T^3/2 & T^2/2 \\ T^3/2 & T^2 & T \\ T^2/2 & T & 1 \end{bmatrix} \quad R = \begin{bmatrix} \sigma_r^2 & 0 \\ 0 & \sigma_v^2 \end{bmatrix} \text{ where,}$$

-continued $\sigma_w$ should be on the order of the bistatic acceleration increment over a sample period where, $\sigma_r$ = bistatic range error *std dev*
$\sigma_v$ = bistatic velocity error *std dev*

In another example embodiment, Cartesian tracker equations for processing noise are given by:

State $$x_{ck} = \begin{bmatrix} p_{cx} \\ v_{cx} \\ p_{cy} \\ v_{cy} \\ p_{cz} \\ v_{cz} \end{bmatrix}_k = \begin{bmatrix} x_{c1} \\ x_{c2} \\ x_{c3} \\ x_{64} \\ x_{c5} \\ x_{c6} \end{bmatrix}_k \text{ where, } \begin{array}{l} p = \text{position} \\ v = \text{velocity} \end{array}$$

Process  $x_{ck} = F_c x_{ck-1} + w_{ck}$ $$F_c = \begin{bmatrix} 1 & T & 0 & 0 & 0 & 0 \\ 0 & 1 & 0 & 0 & 0 & 0 \\ 0 & 0 & 1 & T & 0 & 0 \\ 0 & 0 & 0 & 1 & 0 & 0 \\ 0 & 0 & 0 & 0 & 1 & T \\ 0 & 0 & 0 & 0 & 0 & 1 \end{bmatrix} \text{ where } T = \text{sample time}$$

Measurement  $z_k = h_c(x_{ck}) + v_k$ where $h(x_{ck})$ is the nonlinear Cartesian measurement coupling function from the slides above In another example embodiment, Cartesian tracker equations for processing noise is given by:

Process equation  $x_{bk} = F_c x_{ck-1} + w_{ck}$ where $w_{ck}$ is a 6– element (vector) white noise sequence with covariance matrix $Q_c$:

$$Q_c = \begin{bmatrix} \sigma_{wx}^2 T^2/2 & \sigma_{mx}^2 T & 0 & 0 & 0 & 0 \\ \sigma_{wx}^2 T & \sigma_{wx}^2 & 0 & 0 & 0 & 0 \\ 0 & 0 & \sigma_{wy}^2 T^2/2 & \sigma_{wy}^2 T & 0 & 0 \\ 0 & 0 & \sigma_{wy}^2 T & \sigma_{wy}^2 & 0 & 0 \\ 0 & 0 & 0 & 0 & \sigma_{wz}^2 T^2/2 & \sigma_{wz}^2 T \\ 0 & 0 & 0 & 0 & \sigma_{wz}^2 T & \sigma_{wz}^2 \end{bmatrix}$$ and where $\sigma_{wx}^2$ is the variance of the target acceleration in the $x$–direction, etc.

In this example embodiment, a Cartesian tracker uses the same bistatic radar measurements as the bistatic tracker. In one example embodiment, the Cartesian tracker assumes that the detections are uncorrelated, although the bistatic measurements (eg., detections) may be correlated.

In one example embodiment, Cartesian tracker equations are given by:

$$z_k = h_c(x_{ck}) + v_k \quad \text{Measurement equation}$$

where, $$h_c(x_{ck}) = \begin{bmatrix} r_b \\ v_b \\ p_{cx} \\ p_{cy} \\ p_{cz} \end{bmatrix}_k = \begin{bmatrix} \sqrt{(x_1 - x_t)^2 + (y_1 - y_t)^2 + (z_1 - z_t)^2} + \sqrt{(x_1 - x_r)^2 + (y_1 - y_r)^2 + (z_1 - z_r)^2} - b \\ \frac{(x_1 - x_t)x_2 + (y_1 - y_t)x_4 + (z_1 - z_t)x_6}{\sqrt{(x_1 - x_t)^2 + (y_1 - y_t)^2 + (z_1 - z_t)^2}} + \frac{(x_1 - x_r)x_2 + (y_1 - y_r)x_4 + (z_1 - z_r)x_6}{\sqrt{(x_1 - x_r)^2 + (y_1 - y_r)^2 + (z_1 - z_r)^2}} \\ x_1 \\ x_3 \\ x_5 \end{bmatrix}_k$$

and where,
$[x_t, y_t, z_t]^T$ = transmitter location in ECEF
$[x_r, y_r, z_r]^T$ = receiver location in ECEF
$[x_1, y_1, z_1]^T = [x_{c1}, y_{c3}, z_{c5}]$ = target location in ECEF
b = baseline distance between the transmitter and receiver (scalar)

In this example embodiment, the Cartesian tracker uses the same raw bistatic radar measurements as the bistatic tracker. The Cartesian tracker assumes that its measurements are uncorrelated. The outputs of the bistatic tracker are correlated, and would lead to suboptimal performance if used in the Cartesian tracker. In this example embodiment, the filter module 164 uses angle of arrival information intersected with the bistatic range ellipsoid to estimate target position. In another example embodiment, the filter module 164 represents the angle of arrival as a line-of-sight measurement.

In another example embodiment, a Cartesian tracker uses measurement noise equations:

$$z_k = h_c(x_{ck}) + v_k \quad \text{Measurement equation}$$

where $v_k$ is described by the covariance matric $R_c$ (an augmented version R for the bistatic tracker, also assumed to be uncorrelated in the first two terms):

$$R_c = \begin{bmatrix} \sigma_r^2 & 0 & 0 & 0 & 0 \\ 0 & \sigma_v^2 & 0 & 0 & 0 \\ 0 & 0 & R_{p11} & R_{p12} & R_{p13} \\ 0 & 0 & R_{p21} & R_{p22} & R_{p23} \\ 0 & 0 & R_{p31} & R_{p32} & R_{p33} \end{bmatrix}$$

where, $\sigma_r$=bistatic range measurement error std dev
$\sigma_v$=bistatic velocity measurement error std dev
$R_p$=3×3 position error covariance sub-matrix (fully populated in general due to the properties of the bistatic ellipsoid intersection problem)

In one example embodiment, a Cartesian tracker uses Jacobian equations. In one example embodiment, Jacobian equations are given by:

$$h_c(x_{ck}) = \begin{bmatrix} r_b \\ v_b \\ p_{cx} \\ p_{cy} \\ p_{cz} \end{bmatrix}_k = \begin{bmatrix} \sqrt{(x_1-x_t)^2+(x_3-y_t)^2+(x_5-z_t)^2} + \sqrt{(x_1-x_r)^2+(x_3-y_r)^2+(x_5-z_r)^2} - b \\ \frac{(x_1-x_t)x_2+(x_3-y_t)x_4+(x_5-z_t)x_6}{\sqrt{(x_1-x_t)^2+(x_3-y_t)^2+(x_5-z_t)^2}} + \frac{(x_1-x_r)x_2+(x_3-y_r)x_4+(x_5-z_r)x_6}{\sqrt{(x_1-x_r)^2+(x_3-y_r)^2+(x_5-z_r)^2}} \\ x_1 \\ x_3 \\ x_5 \end{bmatrix}_k$$

where c-subscripts are omitted for brevity, then taking the Jacobian of $h_c$ gives, $$H_{ck} = \left.\frac{\partial h_c(x_c)}{\partial x_c}\right|_{x_{ck}} = \begin{bmatrix} H_{11} & 0 & H_{13} & 0 & H_{15} & 0 \\ H_{21} & H_{22} & H_{23} & H_{24} & H_{25} & H_{26} \\ 1 & 0 & 0 & 0 & 0 & 0 \\ 0 & 0 & 1 & 0 & 0 & 0 \\ 0 & 0 & 0 & 0 & 1 & 0 \end{bmatrix}_k \text{ where, } \ldots$$

$$H_{11} = \frac{\partial h_1}{\partial x_1} = \frac{x_1-x_t}{\sqrt{(x_1-x_t)^2+(x_3-y_t)^2+(x_5-z_t)^2}} +$$

$$\frac{x_1-x_r}{\sqrt{(x_1-x_r)^2+(x_3-y_r)^2+(x_5-z_r)^2}} = H_{22}$$

$$H_{13} = \frac{\partial h_1}{\partial x_3} = \frac{x_3-y_t}{\sqrt{(x_1-x_t)^2+(x_3-y_t)^2+(x_5-z_t)^2}} +$$

$$\frac{x_3-y_r}{\sqrt{(x_1-x_r)^2+(x_3-y_r)^2+(x_5-z_r)^2}} = H_{24}$$

$$H_{15} = \frac{\partial h_1}{\partial x_5} = \frac{x_5-z_t}{\sqrt{(x_1-x_t)^2+(x_3-y_t)^2+(x_5-z_t)^2}} +$$

$$\frac{x_5-z_r}{\sqrt{(x_1-x_r)^2+(x_3-y_r)^2+(x_5-z_r)^2}} = H_{26}$$

$$H_{21} = \frac{\partial h_2}{\partial x_1} = \frac{x_2}{\sqrt{(x_1-x_t)^2+(x_3-y_t)^2+(x_5-z_t)^2}} +$$

$$\frac{x_2}{\sqrt{(x_1-x_r)^2+(x_3-y_r)^2+(x_5-z_r)^2}} -$$

$$\frac{(x_1-x_t)(x_2(x_1-x_t)+x_4(x_3-y_t)+x_6(x_5-z_t))}{((x_1-x_t)^2+(x_3-y_t)^2+(x_5-z_t)^2)^{\frac{3}{2}}} -$$

$$\frac{(x_1-x_r)(x_2(x_1-x_r)+x_4(x_3-y_r)+x_6(x_5-z_r))}{((x_1-x_r)^2+(x_3-y_r)^2+(x_5-z_r)^2)^{\frac{3}{2}}}$$

$$H_{23} = \frac{\partial h_2}{\partial x_3} = \frac{x_4}{\sqrt{(x_1-x_t)^2+(x_3-y_t)^2+(x_5-z_t)^2}} +$$

$$\frac{x_4}{\sqrt{(x_1-x_r)^2+(x_3-y_r)^2+(x_5-z_r)^2}} -$$

$$\frac{(x_3-y_t)(x_2(x_1-x_t)+x_4(x_3-y_t)+x_6(x_5-z_t))}{((x_1-x_t)^2+(x_3-y_t)^2+(x_5-z_t)^2)^{\frac{3}{2}}} -$$

$$\frac{(x_3-y_r)(x_2(x_1-x_r)+x_4(x_3-y_r)+x_6(x_5-z_r))}{((x_1-x_r)^2+(x_3-y_r)^2+(x_5-z_r)^2)^{\frac{3}{2}}}$$

$$H_{25} = \frac{\partial h_2}{\partial x_5} = \frac{x_6}{\sqrt{(x_1-x_t)^2+(x_3-y_t)^2+(x_5-z_t)^2}} +$$

$$\frac{x_6}{\sqrt{(x_1-x_r)^2+(x_3-y_r)^2+(x_5-z_r)^2}} -$$

$$\frac{(x_5-z_t)(x_2(x_1-x_t)+x_4(x_3-y_t)+x_6(x_5-z_t))}{((x_1-x_t)^2+(x_3-y_t)^2+(x_5-z_t)^2)^{\frac{3}{2}}} -$$

$$\frac{(x_5-z_r)(x_2(x_1-x_r)+x_4(x_3-y_r)+x_6(x_5-z_r))}{((x_1-x_r)^2+(x_3-y_r)^2+(x_5-z_r)^2)^{\frac{3}{2}}}$$

In another example embodiment, the track module 160 associates expected next detections and received detections using an a priori state estimate and covariance from a Kalman filter for a bistatic track and compares it to each candidate measurement (e.g., detection).

In this example embodiment, given radar measurements in a two-dimensional matrix, the detection module 162 determines which measurement (e.g., column) best corresponds to the track in question by covariance gating. In one example embodiment, covariance gating includes checking which radar measurement in the matrix has a smaller TMD (Total Mahalanobis Distance) using the residual and if the TMD is small enough to meet certain criteria. In this example embodiment, the residual is the difference between the measured detection and the a priori (next expected detection) state of the target.

In this example embodiment, in response to more than one measured detection satisfying having a TMD below a predefined threshold value, the detection module 162 selects the candidate detection with the lowest TMD.

In this way, and as previously described, in response to a detection satisfying the TMD, the track manager module 140 increases a classification for the track module 160.

In another example embodiment, the Mahalanobis distance is determined by:

Mahalanobis distance (MD) of the residual WRT the residual covariance matrix (how it's often done) is . . .

$$d_{mr}^2 = (z_k - H_k \hat{x}_{\bar{k}})^T (H_k P_{\bar{k}}^- H_k^T + R_k)^{-1} (z_k - H_k \hat{x}_{\bar{k}})$$

$$d_{mr}^2 = r_k^T (H_k P_{\bar{k}}^- H_k^T + R_k)^{-1} r_k$$

$$d_{mr} = \sqrt{r_k^T (H_k P_{\bar{k}}^- H_k^T + R_k)^{-1} r_k} \; MD \; WRT \text{ the residual covariance}$$

But if we treat the two parts of the TMD separately (WRT state estimate and measurement error covariances), . . .

$$d_{ms}^2 = r_k^T (H_k P_{\bar{k}}^- H_k^T)^{-1} r_k \; MD \; WRT \text{ the state estimate covariance}$$

$$d_{mm}^2 = r_k^T (R_k)^{-1} r_k \; MD \; WRT \text{ the measurement covariance}$$

$$d_{mt} = d_{ms} + d_{mm}$$
$$= \sqrt{r^T k (H_k P_{\bar{k}}^- H_k^T)^{-1} r_k} + \sqrt{r_k^T (R_k)^{-1} r_k} \; TMD$$

In this example embodiment, the detection module 162 weighs the two distances individually. Looking at the MD (Mahalanobis Distance) from the perspective of each covariance matrix independently may provide more flexibility in data association covariance gating. For example, the detection module 162 may associate measurements with up to three sigmas of state estimate error and up to 5 sigmas of measurement error for a total of 8 sigmas. In this example, TMD is more intuitive than MD because it is a sum total of the number of simas this residual has with respect to the state estimate and measurement covariance matrices considered separately. In certain embodiments, this also restricts measurement noise from masking the state error covariance.

In one example embodiment, a three-dimensional object tracking system includes the track manager module 140 that is configured to receive detections of objects in a three-dimensional space. In this example embodiment, the track manager module 140 includes a plurality of track modules wherein each of the plurality of track modules are associated with a track and include a detection module 162 configured to request, from the track manager module, at least one of the detections that correspond to the associated track; and a filter module 164 configured to determine whether the detection matches the associated track and add the requested detection to the associated track in response to the detection matching the associated track.

In another example embodiment, the track manager module 140 is further configured to provision an additional track module in response to a detection not being requested by currently provisioned track modules.

In one example embodiment, the track manager module is further configured to delete a track module in response to no detections matching a track associated with the track module. In this example embodiment, the track is terminated.

In another example embodiment, the track manager module is further configured to assign a classification level to a track module, the classification level selected from a group of predefined classification levels.

In other example embodiments, the track manager module is further configured to decrease a classification level for a second track module in response to there being no detections that are associated with a track of the second track module.

In one example embodiment, the track manager module is further configured to increase a classification level for a third track module in response to there being a detection that is associated with a track for the third track module.

In another example embodiment, respective track modules are further configured to apply the filter module 164 in response to the track module having a classification level that matches a predefined classification level. In one example embodiment, the predefined classification level is a highest classification level. Of course, this is not necessarily the case and this disclosure is not limited in this regard.

Figure 2:
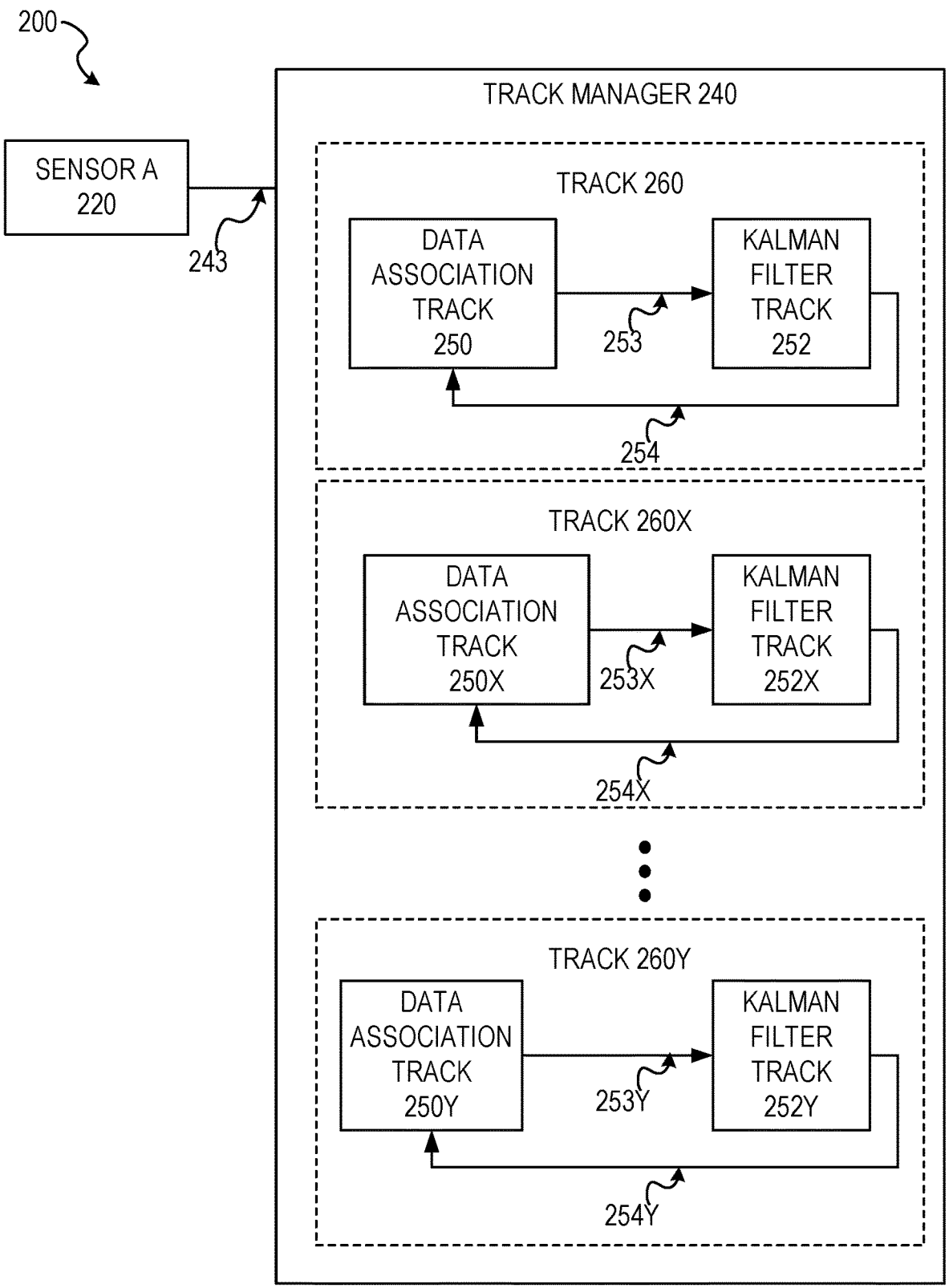
FIG. 2 is an illustration depicting an object tracking system, according to one example embodiment.

FIG. 2 is an illustration depicting an object tracking system 200, according to one example embodiment. In this example embodiment, the object tracking system 200 includes a sensor 220 and a track manager 240 which includes a plurality of tracks 260, 260X, 260Y. As depicted in FIG. 2, each track 260 includes a data association track 250 and a Kalman filter track 252.

A first track 260 comprises a first data association track 250, and a Kalman filter track 252. A second track 260X comprises a data association track 250X and Kalman filter Track 252X, and a third track 260Y includes a data association track 250Y and Kalman filter track 252Y.

Of course, the track manager 240 may include additional sets of data association tracks and Kalman filter tracks and this disclosure is not limited in this regard.

In one example embodiment, in one or more respective sets, the data association track 250 is electrically connected to the Kalman filter track 252 via a connection 253. Of course, one skilled in the art may recognize any number of ways that may connect a data association track with a Kalman filter and this disclosure is not limited in this regard. In another example embodiment, the output of the Kalman filter 252 is connected back to the data association track via connection 254. As with connection 253, the connection 254 may include any type of connection.

Furthermore, in this example embodiment, the data transferred from the data association track 250 to the Kalman filter track 252 via connection 253 includes a single measurement. In addition, the data transferred from the Kalman filter track 252 to the data association track 250 via connection 254 includes state estimate and state estimate error covariance information.

In another example embodiment, the data transferred via connection 253 includes multiple measurements in a synchronous fashion. In yet another embodiment, the data transferred by connection 253 includes multiple measurements obtained in an asynchronous fashion.

In another example embodiment, the data transferred via connection 254 includes full state estimate and state estimate error covariance information. In yet another example embodiment, the data transferred via connection 254 includes partial state estimate and state estimate error covariance information.

Similarly, connection 253X, 253Y, 254X, and 254Y may include any connections and this disclosure is not limited in this regard.

Figure 3:
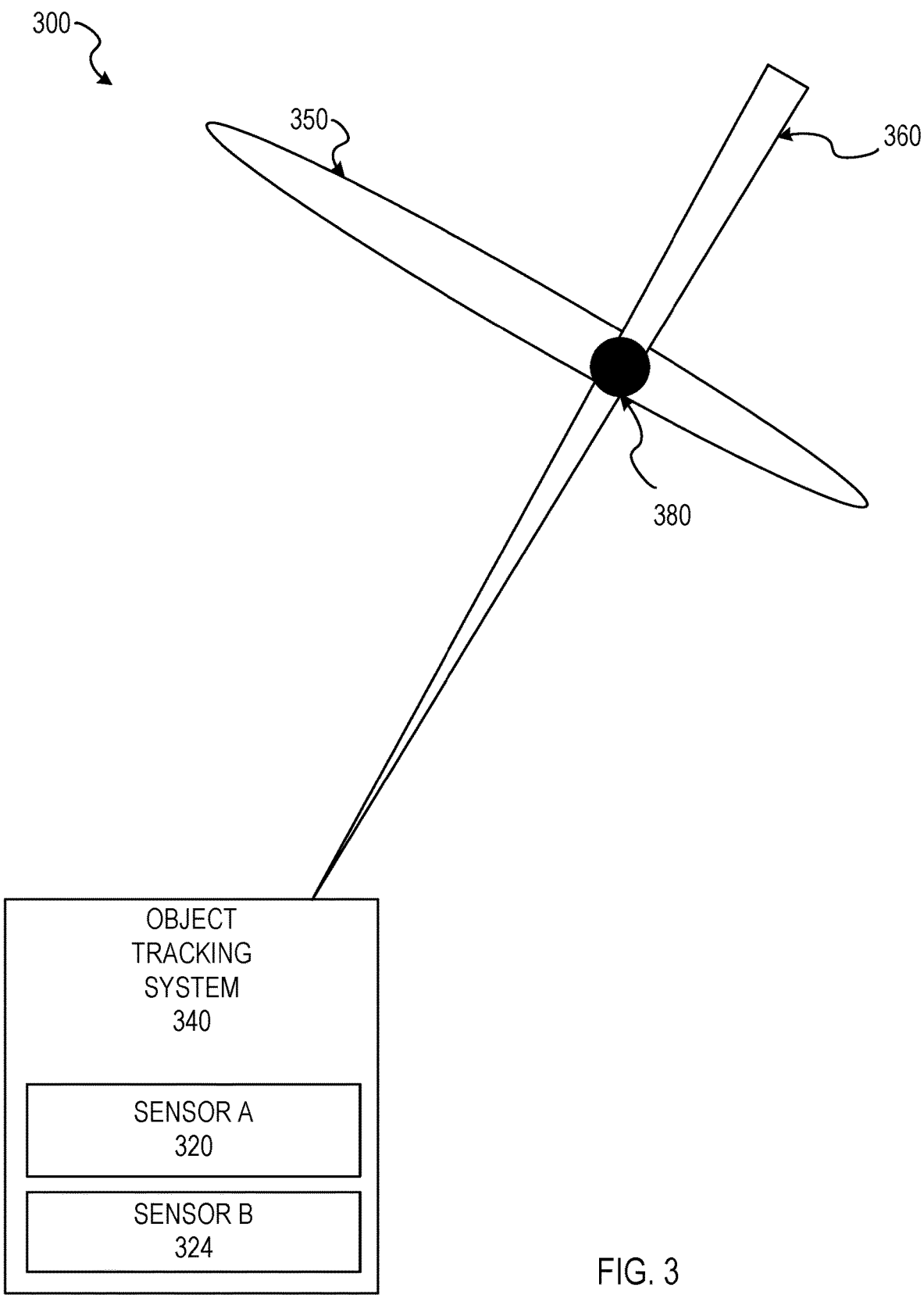
FIG. 3 is another illustration depicting one scenario for tracking objects in a three-dimensional space, according to one example embodiment.

FIG. 3 is another illustration depicting one scenario for tracking objects in a three-dimensional space, according to one example embodiment.

In one example embodiment 300, an object tracking system 340 includes a first sensor A 320 and a second sensor B 324. The object tracking system 340 may or may not be identical to the object tracking system 240 depicted in FIG. 2.

In another example embodiment, the first sensor 320 is a bistatic radar and determines that an object exists at a point within a volumetric uncertainty space 350. The bistatic radar system is more accurate in determining distance to an object 380 than angular direction.

Additionally, in this example embodiment, the sensor B 324 is an EO imager. The EO imager determines an accurate directional vector with uncertainty cone 360 to the object 380. In this example embodiment, the object tracking system combines the detection 350 from the bistatic radar and the detection 360 from the EO imager to generate a more accurate estimate of the target states.

Figure 4:
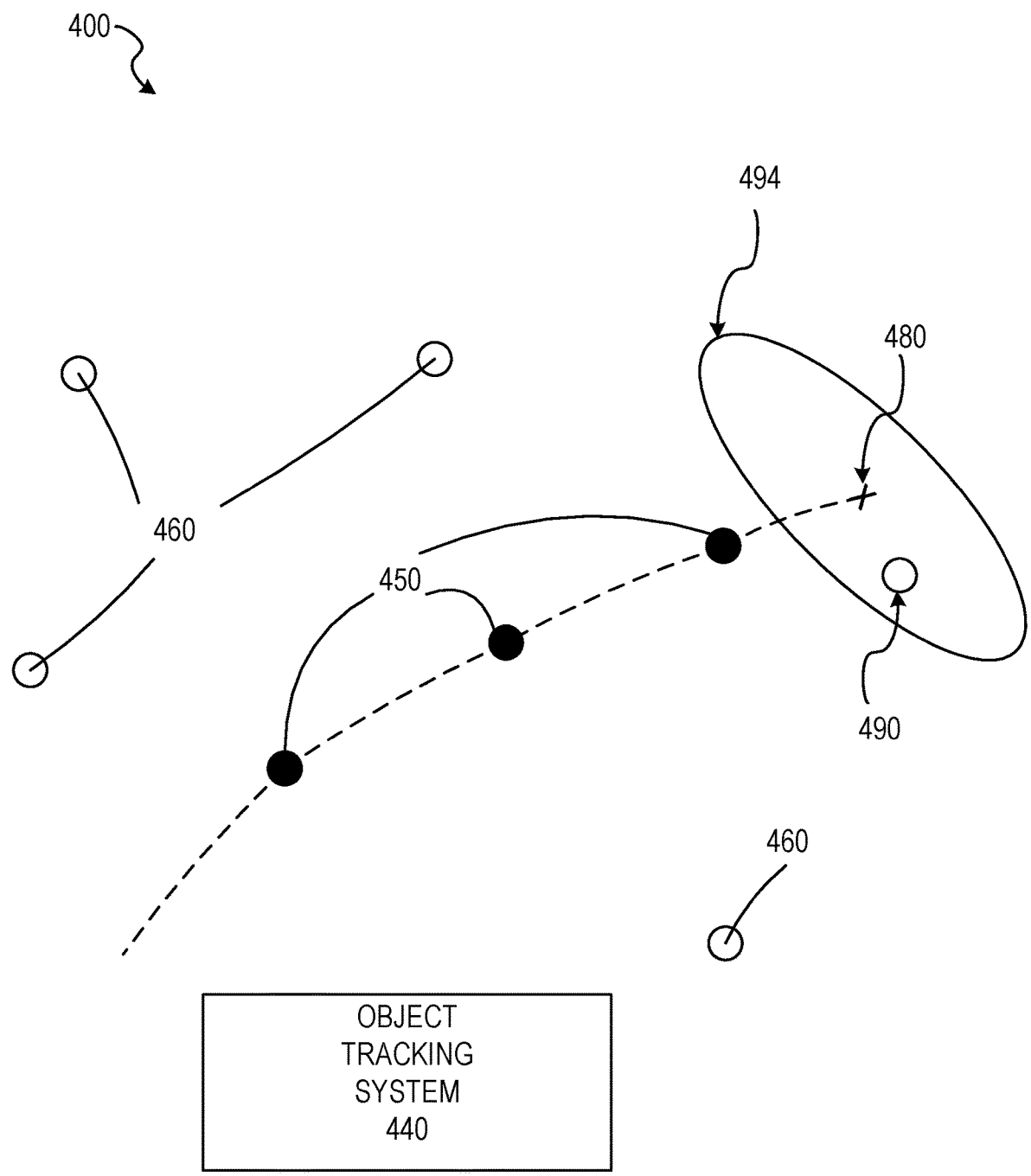
FIG. 4 is an illustration depicting one scenario for tracking objects, according to an example embodiment.

FIG. 4 is an illustration depicting one scenario for tracking objects, according to an example embodiment. In this example embodiment, the object tracking system 440 receives detections from one or more sensors (e.g., sensors 120) representing objects in a three-dimensional space.

In one example embodiment, a confirmed track includes previous state estimates 450. In this example embodiment, a track module for the confirmed track determines a next expected detection at point 480. In response to receiving a detection 490 that is within a threshold distance or error ellipsoid 494 from the point 480, the track module that produced the previous state estimates 450 requests to handle the detection 490. As previously described, the track module selects this detection because it is the most likely detection that corresponds to the object that generated previous state estimates 450. In one example embodiment, an expected next detection includes a state estimate 450.

In other example embodiment, previous state estimates 450 are a combination of previous state estimates and actual received detections. In one example embodiment, the state estimates 450 are an average or median value between a previously expected next detection and a received detection. Other mathematical relationships may exist between expected next detections and received detections and this disclosure is not limited in this regard.

In another example embodiment, the object tracking system 440 receives detections 460 that do not match a currently existing track managed by a track module. In this example embodiment, the object tracking system (e.g., via its respective track manager module 140) provisions an additional track module 160 for each of the respective unassigned detections 460.

Thus, in one example embodiment, in response to a second set of detections being within a threshold error of next expected detections from detections 460, the track manager module 140 may increase a classification for track modules 160 that have been assigned to manage the respective detections.

Figure 5:
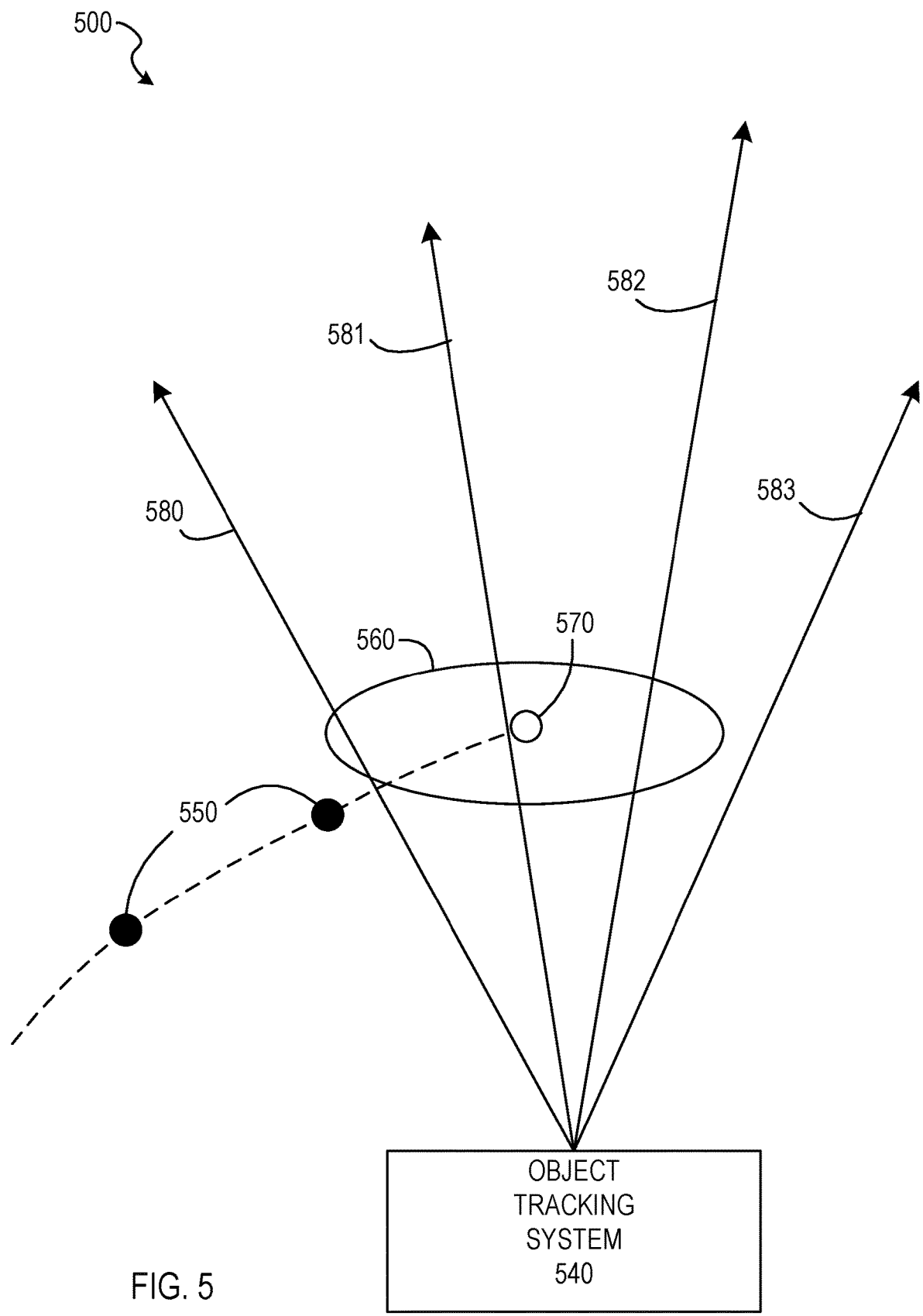
FIG. 5 is another illustration depicting a scenario for tracking objects, according to another example embodiment.

FIG. 5 is another illustration depicting a scenario for tracking objects, according to another example embodiment. In this example embodiment, an object tracking system includes a track module 160 for previous state estimates 550. In this example embodiment, the object tracking system 540 receives detections (580, 581, 582, and 583) from a sensor having accurate directional resolution, but limited distance resolution. In one example, such a sensor is an EO imager.

In one example embodiment, detection 583 does not intersect an expected three-dimensional volume of space 560 for a next expected detection 570. In response, the detection 583 is not considered a candidate as a next detection for the track module 160.

In another example embodiment, detections 580, 581, and 582 do intersect the three-dimensional volume of space 560 for a next expected detection 570. In this example embodiment, the track module 160 determines that the detection 581 will be added to the track for the track module 160 because it most closely satisfies an error measurement between the next expected detection 570 and the detection 581 based on Total Mahalanobis Distance. In one example embodiment, the track module generates a state estimate that is angularly consistent with detection 581 and distance-wise consistent with the next expected detection 570. The track module 160 may then update its track to include the state estimate.

Figure 6:
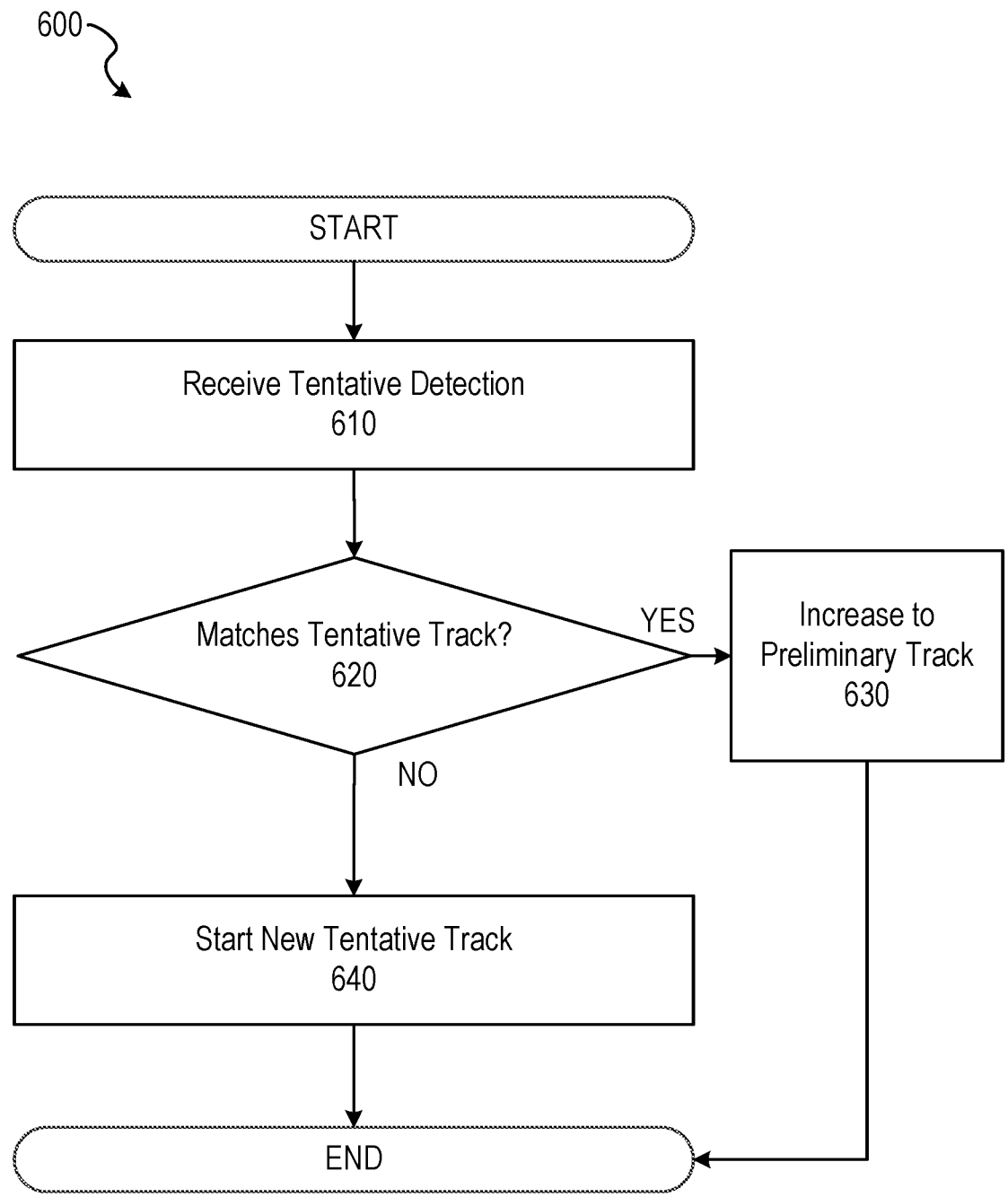
FIG. 6 is a flow diagram illustrating a method for tracking objects, according to one embodiment.

FIG. 6 is a flow diagram 600 illustrating a method for tracking objects, according to one embodiment. Operations in the method 600 may be performed by the object tracking system 100, using modules described above with respect to FIG. 1. As shows in FIG. 6, the method 600 includes operations 610, 620, 630, and 640.

In one example embodiment, the method 600 begins and at operation 610 receives a tentative detection. In certain embodiments, a tentative detection is a detection that matches a tentative track. In another example embodiment, a tentative detection is a detection that does not match any currently provisioned track managers.

The method 600 continues at operation 620 and the track manager module 140 determines whether the received tentative detection matches a currently provisioned tentative track (e.g., matches a track managed by a currently provisioned track module). In response to the tentative detection matching a tentative track, the method 600 continues at operation 630 where the track manager module 140 increases the classification of the current provisioned tentative track to a preliminary track. The method then ends.

In response to the tentative detection not matching a currently provisioned tentative track, the method 600 continues and at operation 640, the track manager module 140 starts a new tentative track using the tentative detection. The method then ends.

Figure 7:
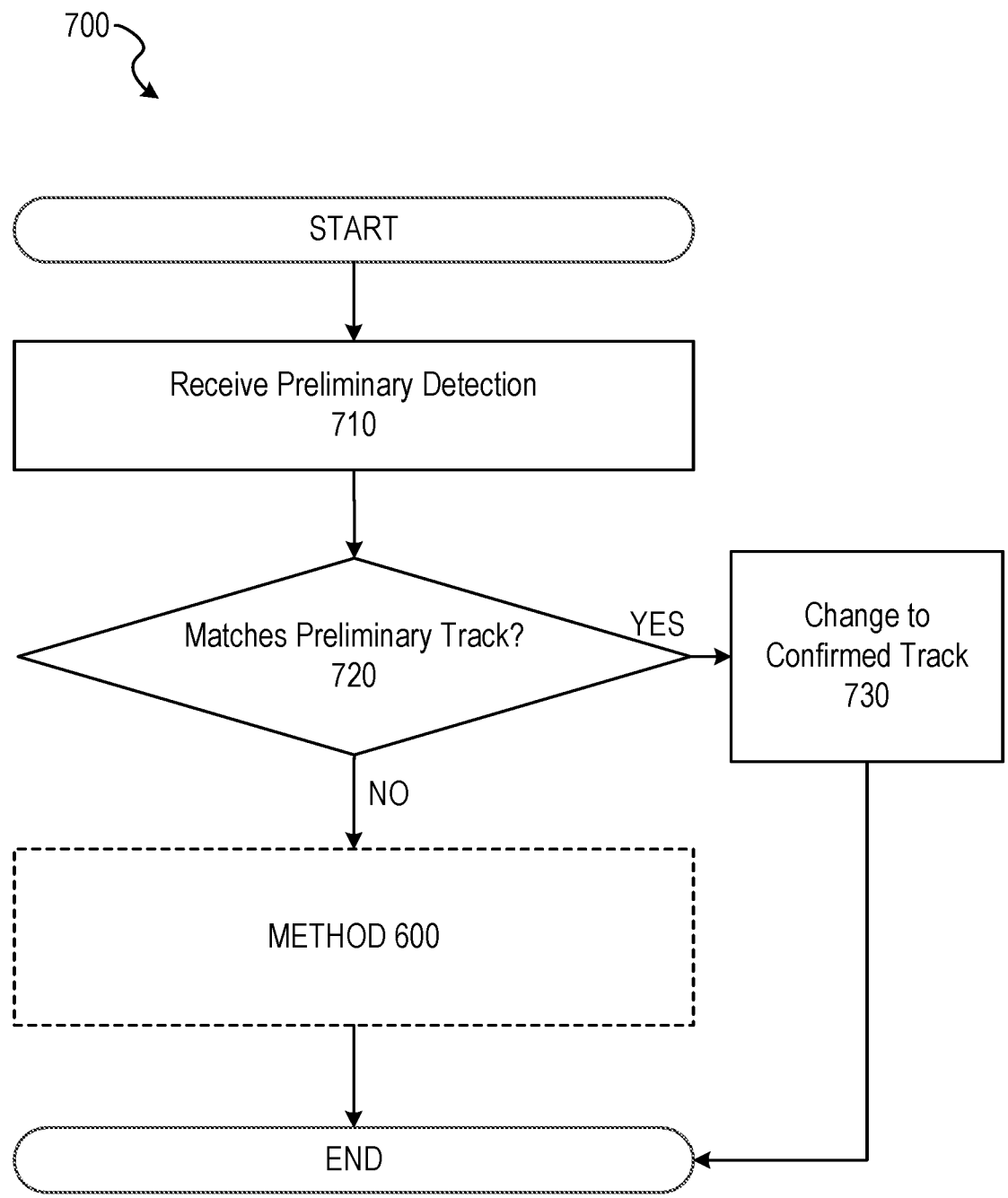
FIG. 7 is another flow diagram illustrating a method for tracking objects, according to another example embodiment.

FIG. 7 is a flow diagram illustrating a method 700 for tracking objects, according to one embodiment. Operations in the method 700 may be performed by the object tracking system 100, using modules described above with respect to FIG. 1. As shows in FIG. 7, the method 700 includes operations 710, 720, and 730.

In one example embodiment, the method 700 begins and at operation 710 receives a preliminary detection. In certain embodiments, a preliminary detection is a detection that matches a preliminary track.

The method 700 continues at operation 720 and the track manager module 140 determines whether the received preliminary detection matches a currently provisioned preliminary track (e.g., matches a preliminary track managed by a currently provisioned preliminary track module). In response to the preliminary detection matching a preliminary track, the method 700 continues at operation 730 where the track manager module 140 increases classification of the current provisioned preliminary track to a confirmed track. In another example embodiment of the method 700, the track manager module 140 increases a numerical value representing a current classification of the associated track module. For example, the track manager module 140 may increase the classification of the associated track module 140 from two to three.

Figure 8:
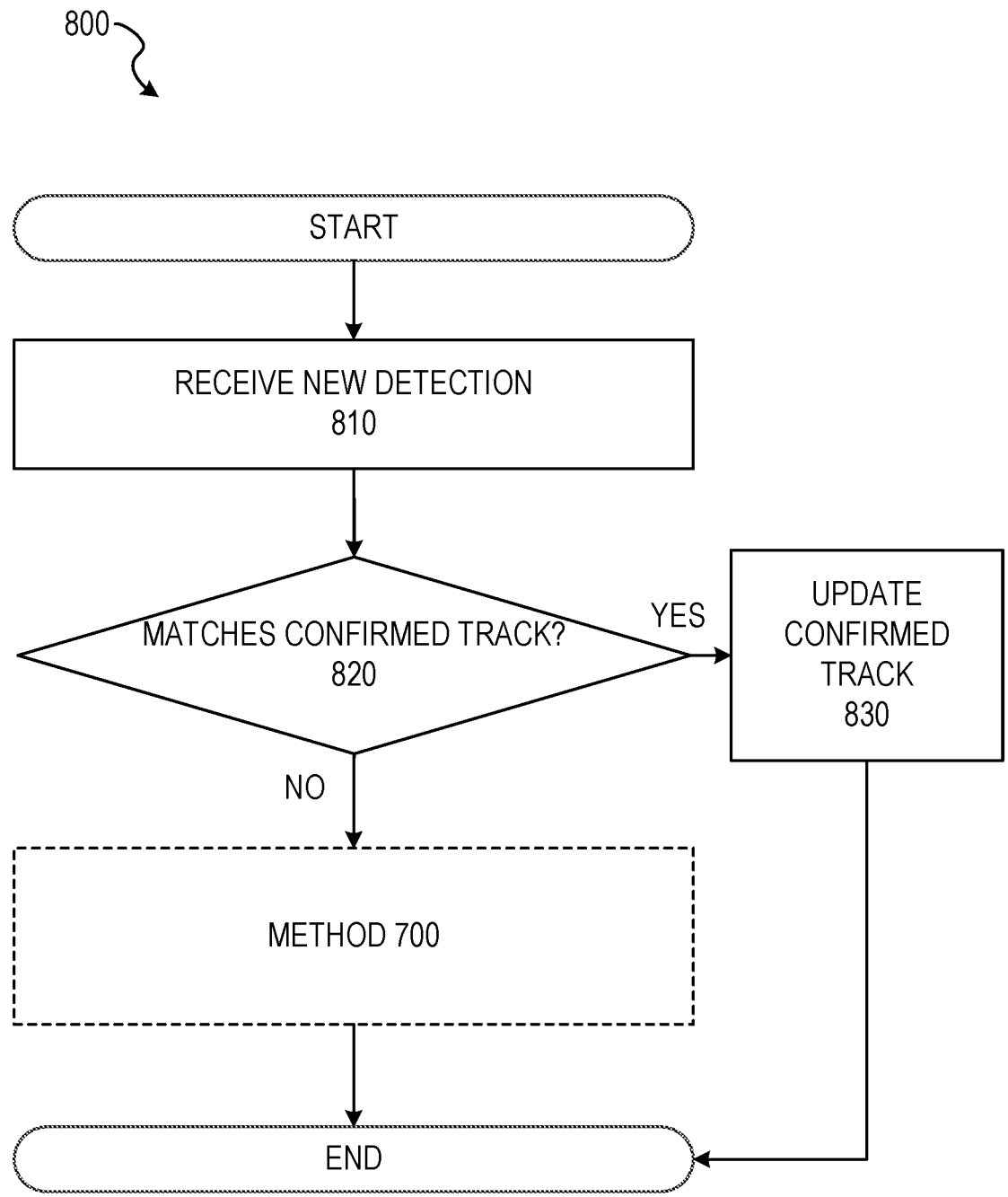
FIG. 8 is one flow diagram depicting a method for tracking objects, according to one example embodiment.

FIG. 8 is a flow diagram illustrating a method 800 for tracking objects, according to one embodiment. In one example embodiment, the method 800 begins and at operation 810 the object tracking system receives a new detection. The method 800 continues at operation 820 and the track manager module 140 determines whether the received detection matches a currently confirmed track (e.g., matches a confirmed track managed by a currently provisioned confirmed track module). In response to the detection matching a confirmed track, the method 800 continues at operation 830 and the track module that manages the confirmed track update the confirmed track with the new detection.

In response to the detection not matching a confirmed track, the method 800 continues and performs method 700 with the new detection being the received preliminary detection received at operation 710. After executing method 700, the method 800 ends.

The methods described in FIG. 6 through FIG. 9, demonstrate one example embodiment of classifications of tracks including preliminary, tentative, and confirmed. Of course, other terms or values may be used to represent the individual classifications of tracks.

In another example embodiment, method 600 is performed for tracks that are at a lowest classification. In this example embodiment, a new track module is provisioned for detections that do not match any currently provisioned tracks.

In one example embodiment, method 700 is executed for tracks that are not at a lowest or highest classification. In another example embodiment, method 800 is executed for tracks that are at a highest classification. In this example embodiment, the classification of the track module that manages tracks at this highest classification does not increase the classification of the track in response to matching a new detection, but simply updates the track with the new detection.

Of course, any number of classifications may be used and this disclosure is not limited in this regard. In another example embodiment, the track manager module 140 increases a classification of an object track in response to two successive detections. In other example embodiments, other values may be used. For example, in some embodiments, the track manager module increases a classification of an object track in response to four successive detections that match the track.

In other example embodiments, the track manager module 140 decreases the classification in response to two or more iterations of detections where no detection matches the track. Again, other values may be used, and this disclosure is not limited in this regard. Furthermore, in other example embodiments, a different number of or proportion of recent detections matching an object track may cause the track manager module to increase a classification as compared with the number of successive missing detections.

Figure 9:
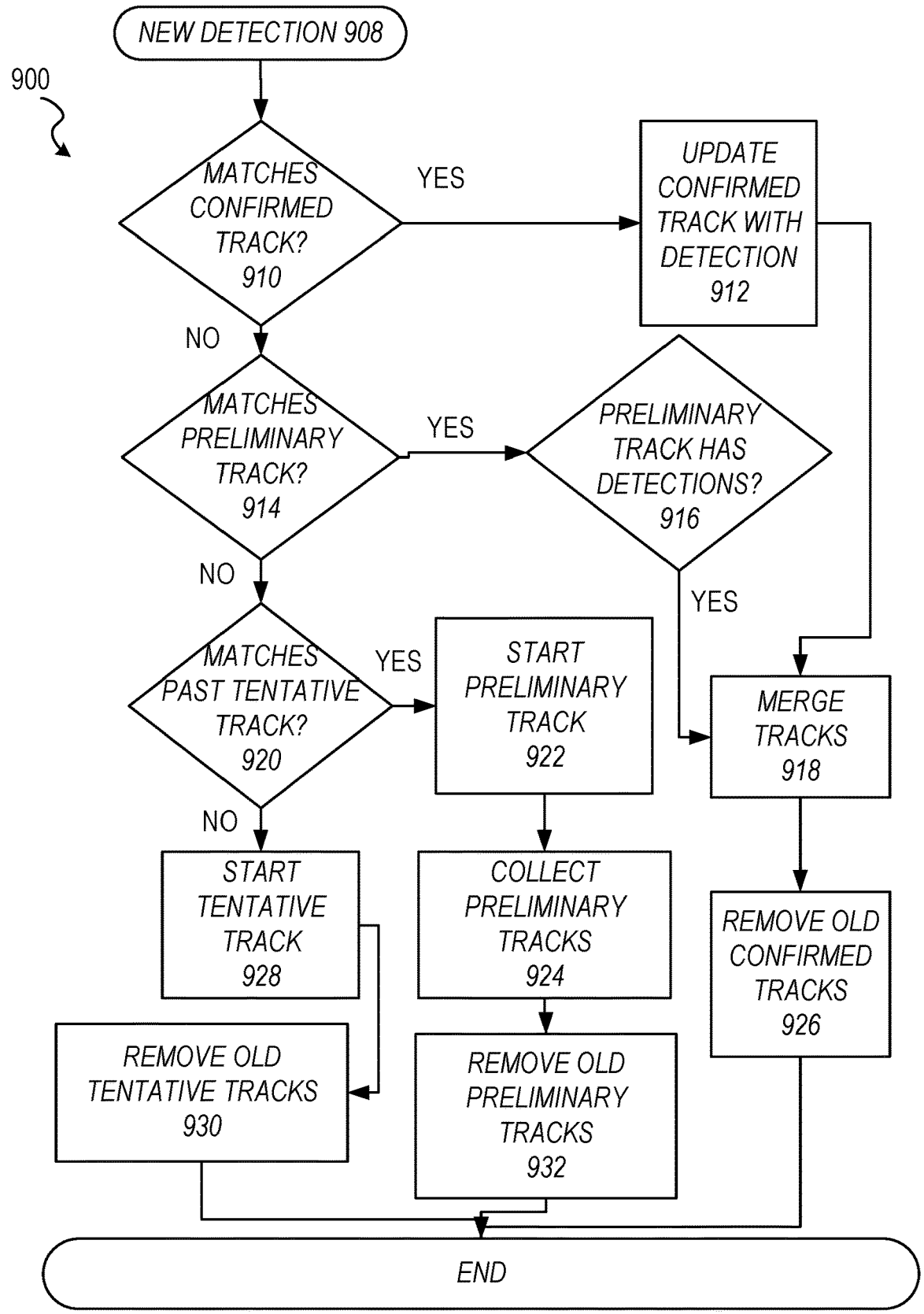
FIG. 9 is another flow diagram illustrating a method for tracking objects, according to another example embodiment.

FIG. 9 is another flow diagram illustrating a method 900 for tracking objects, according to another example embodiment. Operations in the method 900 may be performed by the object tracking system 100, using modules described above with respect to FIG. 1.

The method 900 begins and at operation 910, the track manager module 140 receives a new detection from the sensor 120. The method 900 continues and at operation 910 the track manager module 140 determines whether the detection matches a confirmed track. In response to the detection matching a confirmed track, the method 900 continues at operation 912 and the track manager module 140 updates the matching confirmed track. The method 900 continues at operation 918 and the track module that manages the confirmed track merges the new detection with the confirmed track. The method 900 continues at operation 926 and the track manager module removes old (e.g., terminated) confirmed tracks. In other example embodiments, at step 926, the track manager module decreases a classification for confirmed tracks that received no new detections.

At operation 910, in response to the detection not matching any confirmed tracks, the method 900 continues and at operation 914, the track manager module 140 determines whether the detection matches a preliminary track. In response to the detection matching a preliminary track, the method 900 continues and at operation 916 and the track manager module 140 determines whether the matching preliminary track has previous detections. In response to the preliminary track having previous detections, the method 900 continues at operation 918 and the track manager module 140 merges tracks.

In one example embodiment, merging tracks means increasing classifications for tracks that received new detections, decreasing classifications for tracks that did not received new detections, or removing tracks that were at a lowest classification and received no new detections. As previously described, the method 900 continues at operation 926.

At operation 914, in response to determining that the detection does not match any preliminary tracks, the method 900 continues and at operation 920, the track manager module 140 determines whether the detection matches a previous tentative track. In response to the detection matching a past tentative track, the method 900 continues and at operation 922, the track manager module 140 starts a preliminary track. In another example embodiment, the track manager module 140 promotes the matching past tentative track to a preliminary track. The method continues and at operation 924, the track manager module 140 collects preliminary tracks. The method continues and at operation 932, the track manager module 140 removes preliminary track modules that received no new detections (e.g., track modules that have terminated tracks). In another example embodiment, the track manager module 140 decreases a classification of the preliminary track to a tentative track.

At operation 920, in response to the detection not matching a past tentative track, the track manager module 140 starts a new tentative track 928. The method continues at operation 930 and the track manager module 140 removes terminated tentative tracks.

Figure 10:
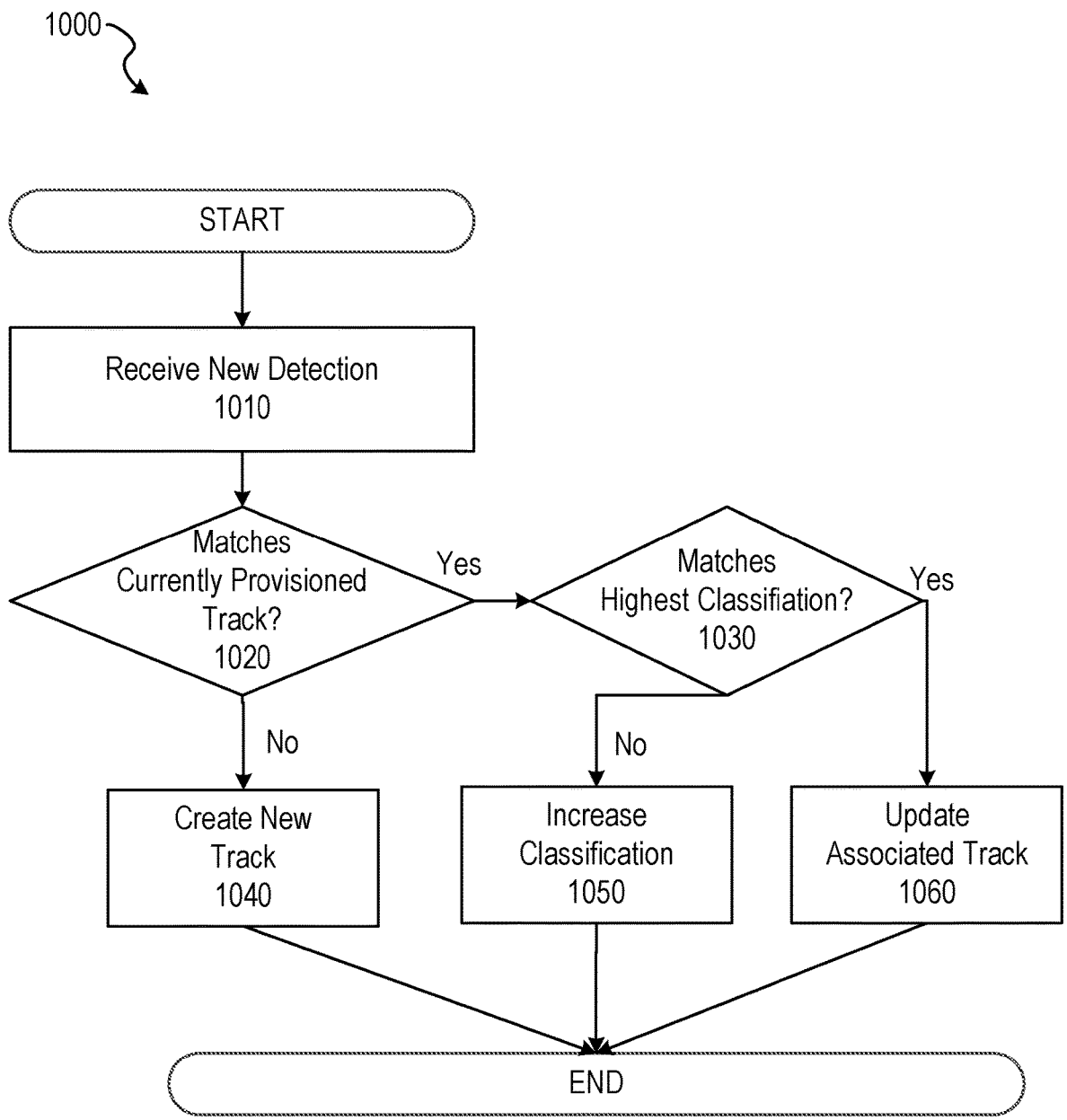
FIG. 10 is a flow diagram illustrating another method for tracking an object, according to one example embodiment.

FIG. 10 is another flow diagram illustrating a method 1000 for tracking objects, according to another example embodiment. Operations in the method 1000 may be performed by the object tracking system 100, using modules described above with respect to FIG. 1.

In one example embodiment, the method begins and at operation 1010 the track manager module 140 receives a new detection from a sensor 120. The method 1000 continues and at operation 1020 the track manager module 140 determines whether the detection matches a currently provisioned track (e.g., at any classification level).

In response to the detection not matching any currently provisioned tracks, the method 1000 continues at operation 1040 and the track manager module 140 creates a new track using the new detection and the method ends.

In response to the detection matching a currently provisioned track, the method 1000 continues and at operation 1030 the track manager module 140 determines whether the matching track matches a highest classification level. In response to the track matching a highest classification level, the track manager module 140 updates the matching track with the new detection. In response to the track not matching a highest classification, the track manager module 140 continues at operation 1050 and increases the classification of the track.

In another example embodiment of the method 1000, the track manager module 140 increases the classification of an object track in response to multiple detections matching the track at the highest classification.

Figure 11:
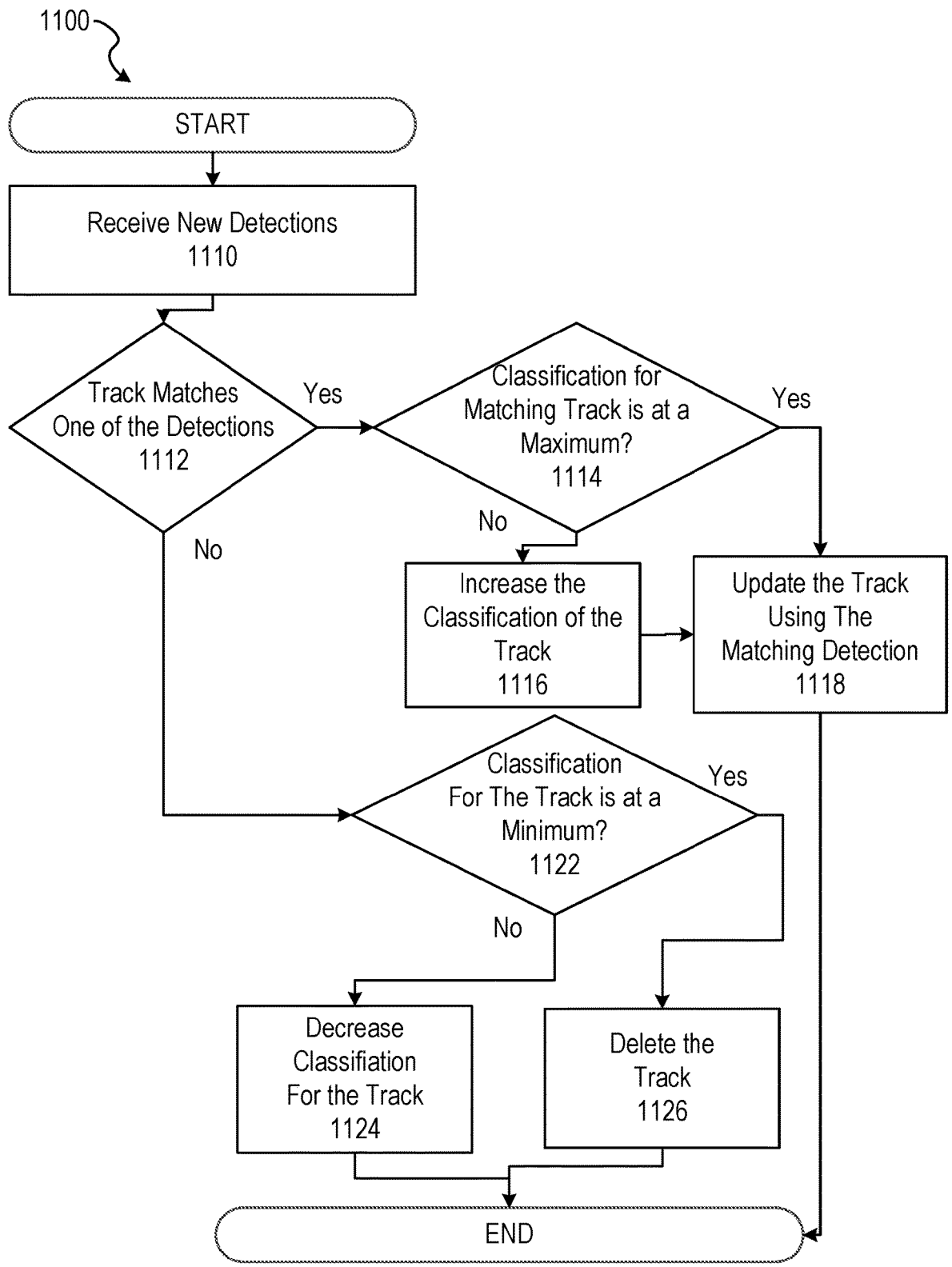
FIG. 11 is another flow diagram illustrating a method for tracking an object, according to one example embodiment.

FIG. 11 is another flow diagram illustrating a method 1100 for tracking objects, according to another example embodiment. Operations in the method 1100 may be performed by the object tracking system 100, using modules described above with respect to FIG. 1.

In one example embodiment, the method 1100 begins and at operation 1110 the track manager module 140 receives a plurality of detections from a sensor 120. The method 1100 continues and at operation 1112 the track manager module 140 determines whether a track module 160 is associated with any of the received detections. In response to the track manager module 140 determining that a track module 160 is associated with one of the detections received at operation 1110, the track manager module 140 determines whether a classification for the track module 140 is at a maximum.

In response to determining that the track module 160 is at a maximum classification level, the method 1100 continues at operation 1118. At operation 1118, the track manager module 140 updates the track for the track module 160 using the detection that matched.

In response to determining that the track module 160 is not at a maximum classification level, the method 1100 continues at operation 1116 and the track manager module 140 increases the classification level of the track module 160 that matched the detection. The method 1100 then continues at operation 1118.

At operation 1112, in response to determining that at track module 160 does not match any of the received detections, the method 1100 continues at operation 1122 and the track manager module 140 determines whether classification for the track module 160 has a minimum classification value. In response to determining that the track module 160 has a minimum classification value, the method 1100 continues at operation 1126 and the track manager module 140 deletes the track module 160 and the method 1100 ends. In response to determining that the track module 160 is not at a minimum (or a lowest) classification value, the method 1100 continues at operation 1124 and the track manager module 140 decreases a classification value for the track module 160. The method then ends.

In another example embodiment, operation 1110 is executed in response each of a set of detections received from the sensor 120. Furthermore, in this example embodiment, operation 1120 is executed in response to a track module 160 not matching any detections for a given threshold number of sets of detections.

Figure 12:
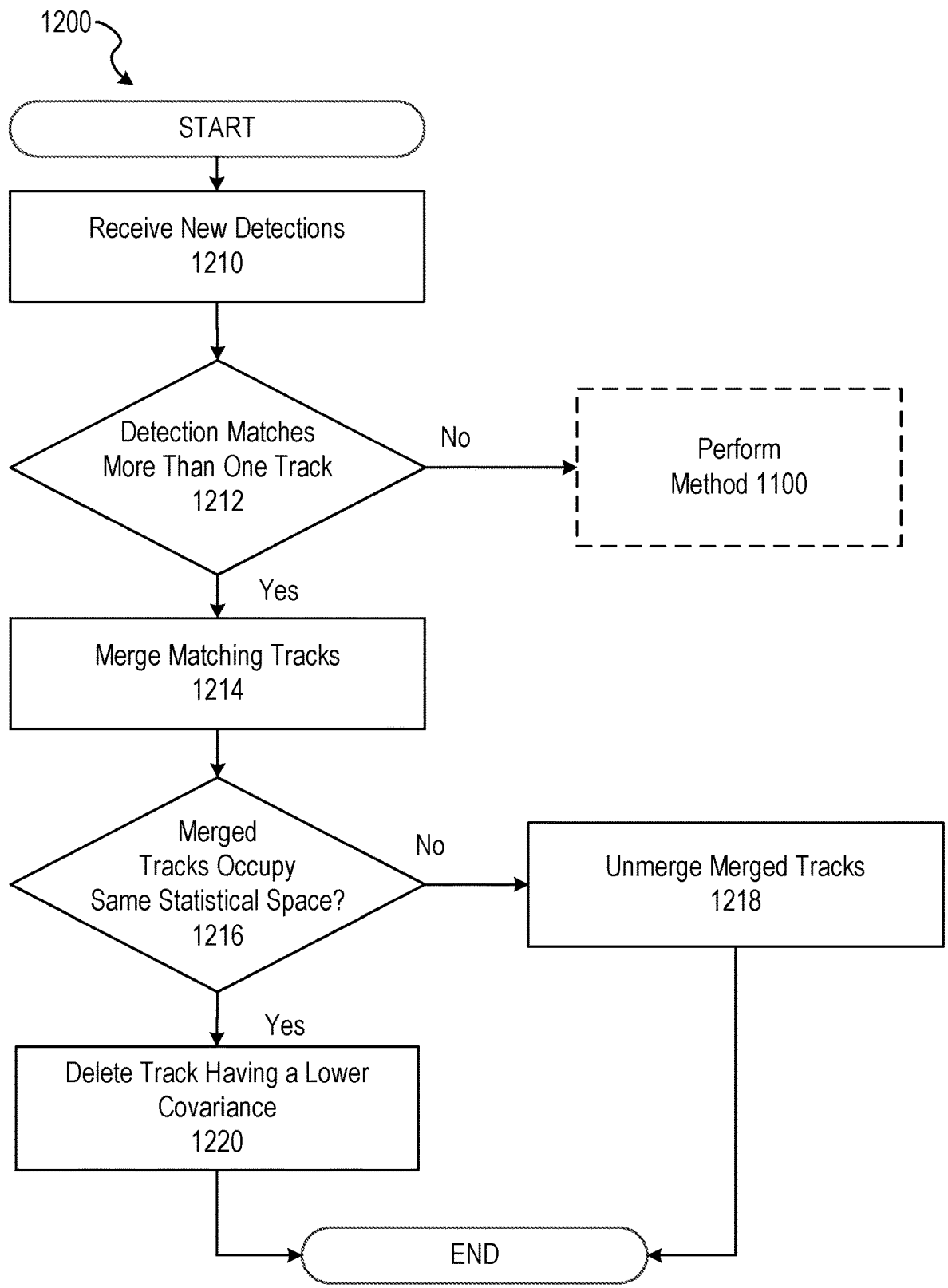
FIG. 12 is one flow diagram illustrating one method for tracking an object, according to another example embodiment.

FIG. 12 is another flow diagram illustrating a method 1200 for tracking objects, according to another example embodiment. Operations in the method 1200 may be performed by the object tracking system 100, using modules described above with respect to FIG. 1.

In one example embodiment, the method 1200 begins and at operation 1210 the track manager module 140 receives a plurality of detections from a sensor 120. The method 1200 continues and at operation 1212 the track manager module 140 determines whether one of the received detections matches more than one track module 160. In response to determining that none of the received detections match more than one track module 160, the track manager module 140 performs operation 1100 on the received detections.

In response to determining that one of the detections matches more than one of the track modules 160, the method 1200 continues at operation 1214 and the track manager module 140 merges the track modules 160 that match the detection.

In one example embodiment, the track manager module 140 merges tracks by combining tracks in the respective matching track modules 160 into a single track module 160. Thus, in this embodiment, the merged track module 160 maintains two or more associated tracks.

The method 1200 continues at operation 1216 and the track manager module 140 determines whether the merged tracks occupy the same statistical space. In certain embodiment, occupying a same statistical space includes the merged tracks covering substantially the same space. In another example embodiment, occupying a same statistical space includes next detections for the merged tracks being within a threshold distance from each other.

In response to determining that the merged tracks do not occupy a same statistical space, the method 1200 continues at operation 1218 and the track manager module 140 unmerges the merged tracks. In one example embodiment, unmerging tracks includes separating merged tracks into separate track modules 160. In another example embodiment, unmerging tracks includes the track manager module 140 provisioning new track modules 160 for each of the merged tracks. The method 1200 then ends.

At operation 1216, in response to determining that the merged tracks occupy a same statistical space as described herein, the method 1200 continues at operation 1220 and the track manager modules 140 deletes merged tracks that have a lower covariance as described here or as one skilled in the art may appreciate. Of course, one skilled in the art may understand how merged tracks may be deleted and saving an object track having a highest covariance value and this disclosure is meant to include all such ways.

In one example embodiment, deleting merged tracks includes saving a merged track with a highest covariance value and removing all other merged tracks.

Certain embodiments are described herein as including logic or a number of components, modules, or mechanisms. Modules may constitute either software modules (e.g., code embodied on a machine-readable medium or memory) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-12 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 13:
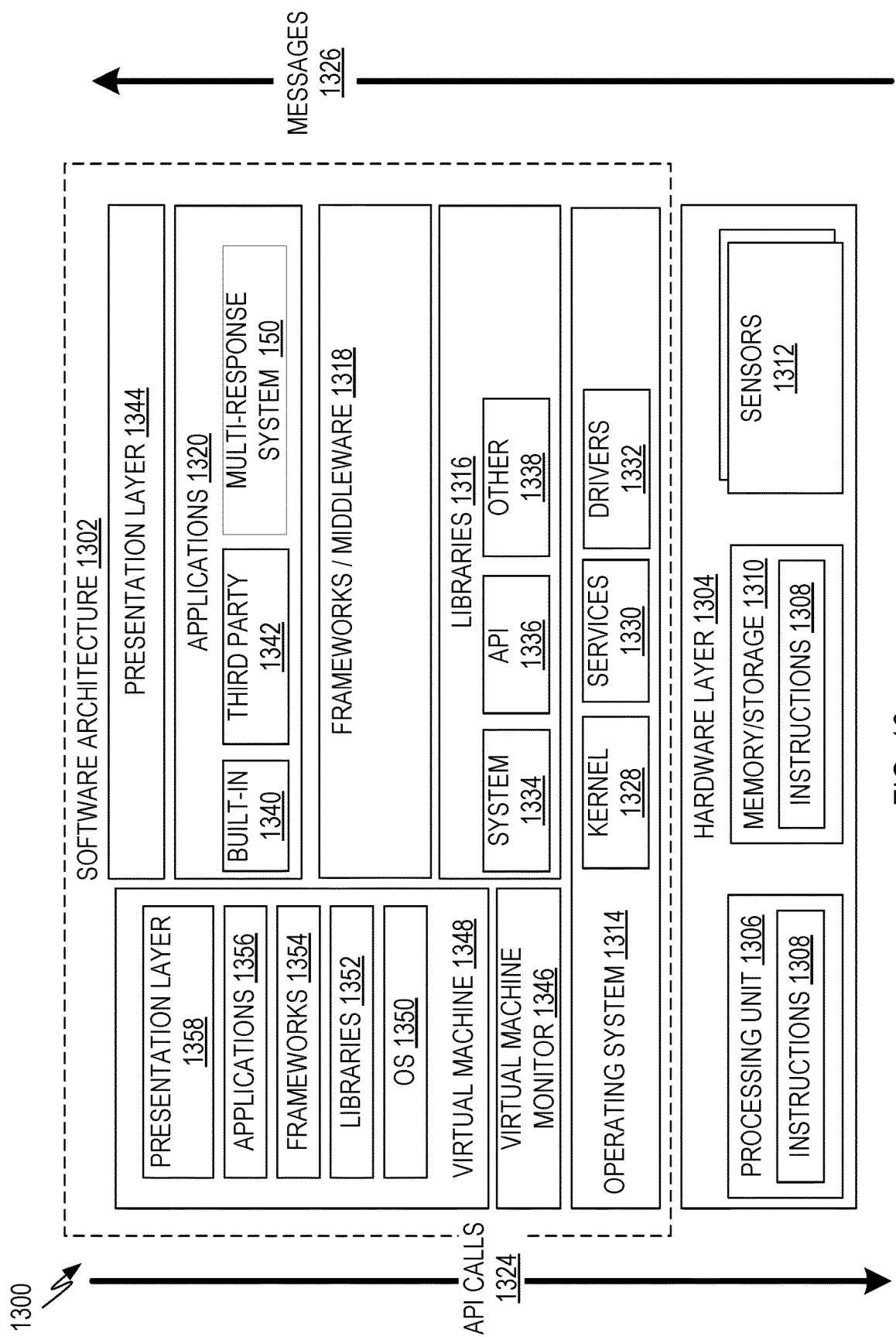
FIG. 13 is a block diagram illustrating an example of a software architecture that may be installed on a machine, according to some example embodiments.

FIG. 13 is a block diagram 1300 illustrating a representative software architecture 1302, which may be used in conjunction with various hardware architectures herein described. FIG. 13 is merely a non-limiting example of a software architecture and it will be appreciated that many other architectures may be implemented to facilitate the functionality described herein. The software architecture 1302 may be executing on hardware such as machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. Executable instructions 1308 represent the executable instructions of the software architecture 1302, including implementation of the methods, modules and so forth of FIGS. 1-12. Hardware layer 1304 also includes memory and/or storage modules 1310, which also have executable instructions.

1308. Hardware layer 1304 may also comprise other hardware as indicated by 1312 which represents any other hardware of the hardware layer 1304, such as the other hardware illustrated as part of machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320 and presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide a frameworks/middleware 1318 layer, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, sensor drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 layer (also sometimes referred to as middleware) may provide a higher-level common infrastructure that may be utilized by the applications 1320 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1320 and/or other software components/modules, some of which may be specific to a particular operating system or platform. In certain embodiments, frameworks/middleware may include sensor interface instructions, sensor data processing instructions, or the like.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. Third party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1342 may invoke the API calls 1324 provided by the mobile operating system, such as operating system 1314, to facilitate functionality described herein.

The applications 1320 may utilize built-in operating system functions (e.g., kernel 1328, services 1330 and/or drivers 1332), libraries (e.g., system libraries 1334, API libraries 1336, and other libraries 1338), frameworks/middleware 1318 to create user interfaces to interact with users of the system. Alternatively, or additionally, in some systems, interactions with a user may occur through a presentation layer, such as presentation layer 1344. In these systems, the application/module "logic" can be separated from the aspects of the application/module that interact with a user.

In one example embodiment, a sensor interface module is implemented as a library 1316. In another example embodiment, the track manager module 140 is implemented as an application 1320. Of course, one skilled in the art may recognize many different ways how the various modules described herein may be implemented in varying levels described in FIG. 13.

Some software architectures utilize virtual machines. In the example of FIG. 13, this is illustrated by virtual machine 1348. A virtual machine creates a software environment where applications/modules can execute as if they were executing on a hardware machine (such as the machine 1400 of FIG. 14, for example). A virtual machine is hosted by a host operating system (operating system 1314 in FIG. 13) and typically, although not always, has a virtual machine monitor 1346, which manages the operation of the virtual machine as well as the interface with the host operating system (i.e., operating system 1314). A software architecture executes within the virtual machine 1348 such as an operating system 1350, libraries 1352, frameworks/middleware 1354, applications 1356 and/or presentation layer 1358. These layers of software architecture executing within the virtual machine 1348 can be the same as corresponding layers previously described or may be different.

Figure 14:
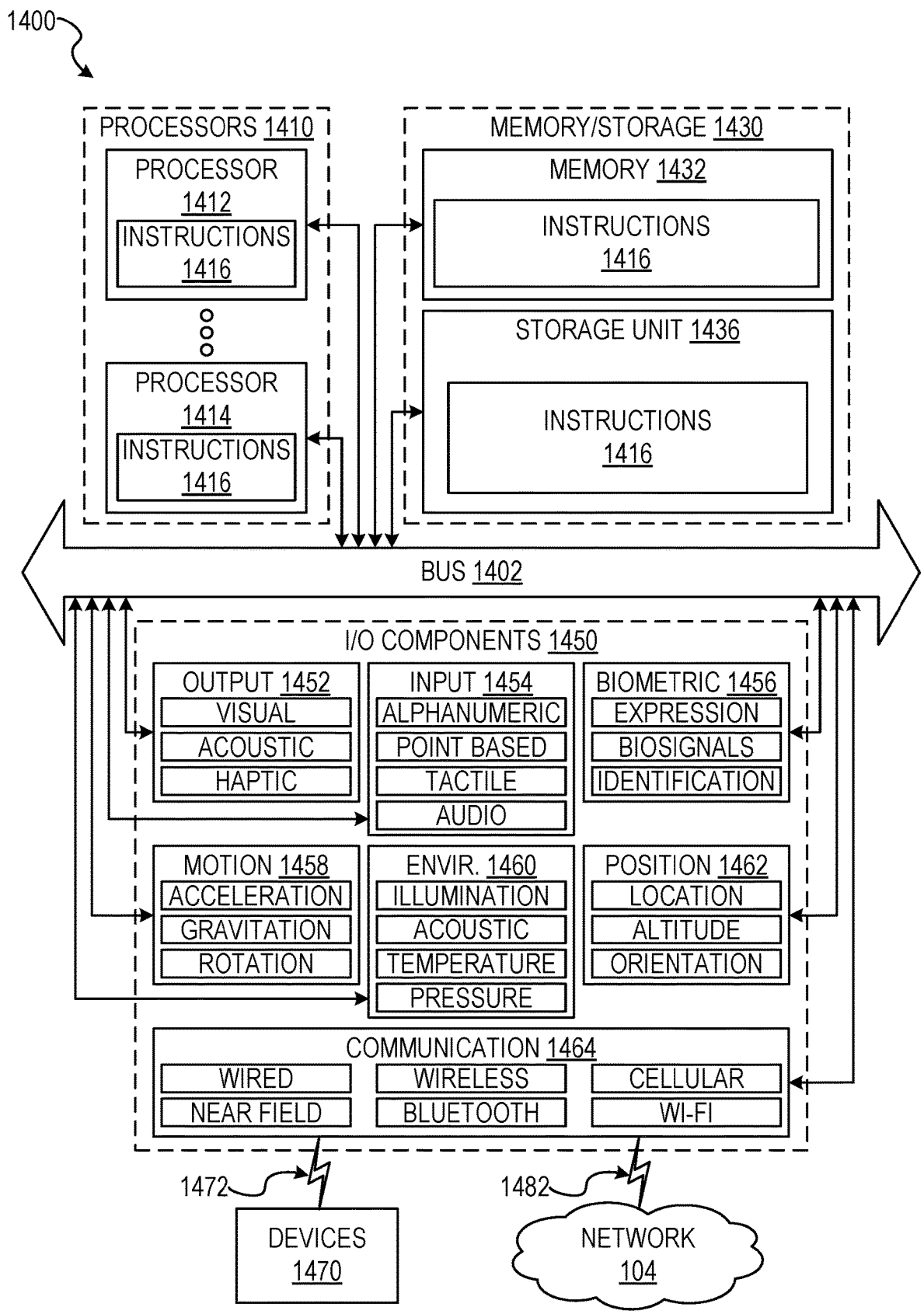
FIG. 14 illustrates a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute the flow diagrams of FIGS. 6-12. Additionally, or alternatively, the instructions 1416 may implement the audio module 520, the response module 540, the results module 560, the location module 590, and/or the cultural module 580 of FIG. 5, and so forth. The instructions 1416 transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1412 and processor 1414 that may execute instructions 1416. The term "processor" is intended to include a multi-core processor that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of processors 1410 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver components), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 104 or devices 1470 via coupling 1482 and coupling 1472 respectively. For example, the communication components 1464 may include a network interface component or other suitable device to interface with the network 104. In further examples, communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geo-location, location via Wi-Fi® signal triangulation, location via detecting an NFC beacon signal that may indicate a particular location, and so forth.

In various example embodiments, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 104 or a portion of the network 104 may include a wireless or cellular network and the coupling 1482 may be a Code Division Multiple Access (CDMA) connection, a Global System for Mobile communications (GSM) connection, or other type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 may be transmitted or received over the network 104 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to devices 1470. The term "transmission medium" shall be taken to include any intangible medium that is capable of storing, encoding, or carrying instructions 1416 for execution by the machine 1400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. An object tracking system comprising:
a track manager module that receives detections; and
a plurality of track modules, wherein each of the plurality of track modules are associated with an object track and comprise:
a detection module configured to determine whether one of the detections corresponds to the object track and to request, from the track manager module, the detection that corresponds to the object track; and
a filter module configured to provide object track data to the detection module and to incorporate the detection that corresponds to the object track with the object track in response to receiving the associated detection.

2. The system of claim 1, wherein the track manager module is further configured to provision an additional track module in response to a detection not being requested by currently provisioned track modules.

3. The system of claim 1, wherein the track manager module is further configured to delete a track module in response to the track module including a terminated track.

4. The system of claim 1, wherein the track manager module is further configured to assign a classification level to a track module, the classification level selected from a group of predefined classification levels.

5. The system of claim 4, wherein the track manager module is further configured to decrease the classification level for the track module in response to there being no detections that are associated with a track of the track module.

6. The system of claim 4, wherein the track manager module is further configured to increase the classification level for a track module in response to there being a detection that is associated with a track for the track module.

7. The system of claim 4, wherein respective track modules are further configured to apply a filter module in response to the track module having a classification level that matches a predefined classification level.

8. The system of claim 4, wherein the track manager module is further configured to merge track modules that are associated with a same detection and delete one of the merged track modules having a lower covariance value that the other of the merged track modules.

9. A method comprising:
receiving a plurality of detections representing objects in a three-dimensional space;
increasing a first classification level for a first existing track in response to at least one of the detections matching the first existing track;
decreasing a second classification level for a second existing track in response to none of the detections matching the second existing track;
updating currently existing tracks at a pre-defined classification level to integrate respective detections that match the currently existing tracks.

10. The method of claim 9, wherein the classification levels are selected from the group consisting of tentative, preliminary, and confirmed, and the predefined classification level is confirmed.

11. The method of claim 9, further comprising provisioning an additional track in response to an unassigned detection not matching any of the currently existing tracks, and updating the additional track to include the unassigned detection.

12. The method of claim 9, further comprising removing a track in response to the track terminating.

13. The method of claim 9, further comprising applying a first level of processing for tracks at a first classification level and a second level of processing for tracks at a second classification level.

14. The method of claim 9, wherein the detections are coordinated detections from two or more sensors.

15. A non-transitory machine-readable storage medium comprising instructions that, when executed by one or more processors of a machine, cause the machine to perform operations comprising:
receiving a plurality of detections representing objects in a three-dimensional space;
increasing a first classification level for a first existing track in response to at least one of the detections matching the first existing track;
decreasing a second classification level for a second existing track in response to none of the detections matching the second existing track; and
updating currently existing tracks at a pre-defined classification level to integrate respective detections that match the currently existing tracks.

16. The machine-readable medium of claim 14, wherein the classification levels are selected from the group consisting of tentative, preliminary, and confirmed, and the predefined classification level is confirmed.

17. The machine-readable medium of claim 14, wherein the instructions further comprise provisioning an additional track in response to an unassigned detection not matching any of the currently existing tracks, and updating the additional track to include the unassigned detection.

18. The machine-readable medium of claim 14, wherein the instructions further comprise removing a dead track in response to none of the detections matching the dead track.

19. The machine-readable medium of claim 14, wherein the instructions further comprise applying a first level of processing for tracks at a first classification level and a second level of processing for tracks at a second classification level.

20. The machine-readable medium of claim 14, wherein the detections are coordinated detections from two or more sensors.

* * * * *